(12) United States Patent
Fuentes Guridi et al.

(10) Patent No.: US 12,242,019 B2
(45) Date of Patent: Mar. 4, 2025

(54) QUANTUM GRAVIMETERS AND GRADIOMETERS

(71) Applicants: The University of Nottingham, Nottingham (GB); University of Vienna, Viennna (AT)

(72) Inventors: Ivette Fuentes Guridi, Nottingham (GB); Dennis Rätzel, Vienna (AT); Tupac Bravo Ibarra, Vienna (AT); David Edward Bruschi, Nottingham (GB)

(73) Assignees: The University of Nottingham, Nottingham (GB); University of Vienna, Vienna (AT)

( * ) Notice: Subject to any disclaimer, the term of this patent is extended or adjusted under 35 U.S.C. 154(b) by 0 days.

(21) Appl. No.: 17/596,523

(22) PCT Filed: Jun. 12, 2020

(86) PCT No.: PCT/GB2020/051434
§ 371 (c)(1),
(2) Date: Dec. 13, 2021

(87) PCT Pub. No.: WO2020/249974
PCT Pub. Date: Dec. 17, 2020

(65) Prior Publication Data
US 2022/0171089 A1   Jun. 2, 2022

(30) Foreign Application Priority Data

Jun. 13, 2019  (GB) .................................... 1908538
Jan. 6, 2020   (GB) .................................... 2000112

(51) Int. Cl.
*G01V 7/02*   (2006.01)
*G01P 15/08*  (2006.01)
*G01V 7/00*   (2006.01)

(52) U.S. Cl.
CPC ................ *G01V 7/02* (2013.01); *G01P 15/08* (2013.01); *G01V 7/00* (2013.01)

(58) Field of Classification Search
CPC .............. G01V 7/02; G01V 7/00; G01P 15/08
See application file for complete search history.

(56) References Cited

U.S. PATENT DOCUMENTS 6,314,809 B1 *  11/2001  Kasevich ................. G01V 7/00
                                                      73/382 R
9,086,429 B1 *   7/2015  Biedermann .......... G01C 19/62
(Continued)

FOREIGN PATENT DOCUMENTS

JP         2011106837 A      6/2011

OTHER PUBLICATIONS

Search Report from UK Application GB2000112.9, dated Jul. 3, 2020, 3 pgs.
(Continued)

*Primary Examiner* — Helen C Kwok
(74) *Attorney, Agent, or Firm* — Husch Blackwell LLP

(57) ABSTRACT

A method of measuring an acceleration using one or more trapped BECs and at least two atomic field modes within those BECs is described. A density distribution of at least one of the one or more BECs is modified by the acceleration, which leads to a change of the field modes' time evolution. The method comprises: selecting two modes that are differently affected by the acceleration; and measuring the acceleration-induced difference; and using the measured acceleration-induced difference to infer the acceleration. Also described is a method of measuring a field gradient using one or more trapped BECs. Each of the trapped BECs has a density distribution, and at least two atomic modes within those BECs, wherein the density distributions of the one or more BECs are modified by the field, which leads to a
(Continued)

change of the atomic modes' time evolution. The method comprises selecting two atomic modes that are differently affected by the field; and measuring a field-induced difference between the selected atomic modes; and using the measured field-induced difference to infer a gradient of the field.

19 Claims, 7 Drawing Sheets

(56) References Cited

U.S. PATENT DOCUMENTS

| | | | |
|---|---|---|---|
| 2010/0012827 A1* | 1/2010 | Vestergaard Hau ... | B82Y 10/00 250/251 |
| 2010/0064767 A1* | 3/2010 | Rice ........................ | G01P 15/18 73/1.79 |
| 2010/0147071 A1 | 6/2010 | Schwartz et al. | |
| 2010/0177317 A1* | 7/2010 | Schwartz ............... | G01C 19/58 356/460 |
| 2010/0180680 A1 | 7/2010 | Zaugg | |
| 2011/0073753 A1* | 3/2011 | Bouyer .................. | G21K 1/006 356/450 |
| 2013/0152680 A1* | 6/2013 | Sackett ................. | G01P 15/093 73/488 |
| 2013/0218504 A1* | 8/2013 | Fall ........................ | G01C 25/00 73/1.38 |
| 2014/0016118 A1* | 1/2014 | Compton ............. | G01C 21/166 356/72 |
| 2014/0022534 A1* | 1/2014 | Strabley ................ | G01P 15/093 356/72 |
| 2017/0356803 A1* | 12/2017 | Bertoldi ................. | G01J 3/453 |
| 2018/0267479 A1* | 9/2018 | Kotru ....................... | H05H 3/02 |
| 2022/0018650 A1* | 1/2022 | Hardman ............ | G01B 9/02001 |

OTHER PUBLICATIONS

Ahmadi et al., "Relativistic Quantum Metrology: Exploiting relativity to improve quantum measurement technologies". Scientific Reports, May 22, 2014, 6 pgs.

Great Britain Search Report, Great Britain Application No. GB1908538.0, mailing date Dec. 13, 2019, 5 pages.

Howl et al., "Exploring the unification of quantum theory and general relativity with a Bose-Einstein condensate", New Journal of Physics, 21 (2019).

Pelegri et al., "Quantum sensing using imbalanced counter-rotating Bose-Einstein condensate modes", New Journal of Physics, 20 (2018).

Howl et al., "Quantum decoherence of phonons in Bose-Einstein condensates", Journal of Physics, 51 (2018).

International Search Report and Written Opinion, International Application No. PCT/GB2020/051434, mailing date Sep. 11, 2020, 16 pages.

Dennis Ratzel et al., "Dynamical response of Bose-Einstein condensates to oscillating gravitational fields", New Journal of Physics, vol. 20, No. 7, Jul. 24, 2018, p. 073044, XP055725056.

Anonymous, "Schwarzschild radius", Jan. 5, 2019, XP055726852, retrieved from the internet: URL: https://en.wikipedia.org/w/index.php?title=Schwarzschild_radius&oldid=876890691.

Gaunt et al., "Bose-Einstein Condensation of Atoms in a Uniform Potential", American Physical Society, PRL 110, 200406, May 16, 2013, 5 pages.

Sabin, et al., "Phonon creation by gravitational waves", New Journal of Physics, 16 (2014) 085003, 16 pages.

Sabin et al., "Thermal noise in BEC-phonoic gravitational wave detectors", EPJ Quantum Technology, 3:8 (2016), 11 pages.

Giovannetti et al., "Advances in Quantum Metrology", Feb. 11, 2011, 10 pages.

Dowling et al., "Quantum optical technologies for metrology, sensing and imaging", Feb. 27, 2015, 12 pages.

Nunnenkamp et al., "Cooling and squeezing via quadratic optomechanical coupling", Physical Review A 82, 021806(R) Aug. 31, 2010, 4 pages.

Meystre, "A short walk through quantum optomechanics", Annalen Physik 525, No. 3, 215-233, Aug. 29, 2021.

Jaskula, et al., "Acoustic Analog to the Dynamical Casimir Effect in a Bose- Einstein Condensate", Physical Review Letters, PRL 109, 220401, Nov. 30, 2012, 5 pages.

Katz, et al., "High sensitivity phonon spectroscopy of Bose-Einstein condensates using matter-wave interference", Jun. 24, 2004, 6 pages.

Karol Gietka et al., " A supersolid-based gravimeter in a ring cavity", ARXIV.org, Cornell University Library, 201 Olin Library Cornell University Ithaca, NY 14853, Dec. 10, 2018, XP081200021.

* cited by examiner

QUANTUM GRAVIMETERS AND GRADIOMETERS

FIELD OF THE INVENTION

The present invention relates to the measurement of acceleration using quantum effects, in particular acceleration due to gravity, and particularly but not exclusively to quantum gravimeters comprising Bose-Einstein condensates (BECs). The present invention also or alternatively relates to the measurement of a field gradient using quantum effects, in particular a gravity gradient, and particularly but not exclusively to quantum gradiometers comprising BECs.

BACKGROUND TO THE INVENTION

Quantum gravimeters exploit quantum properties to measure local gravitational fields with high precision. Applications range from finding pipework under London to navigation and search for oil. Industry and science would strongly benefit not only from a precise instrument but also from a portable one.

Current quantum gravimeters use atom interferometers that measure between a few meters and centimetres and cannot be further miniaturised without losing precision. This is because their precision depends on the interferometer arm length through the atomic time of flight in the interferometer.

Gravitational waves are postulated in the theory of general relativity as distortions in the local gravitational field. It has been shown that such gravitational waves would produce collective excitations (called phonons) in a BEC, and that those phonons are detectable under appropriate conditions.

In C. Sabín, D. E. Bruschi, M. Ahmadi, and I. Fuentes, New J. Phys 16 085003 (2014) it is shown that gravitational waves create phonons in a Bose-Einstein condensate (BEC). A traveling spacetime distortion produces particle creation resonances that correspond to the dynamical Casimir effect in a BEC phononic field contained in a cavity-type trap. It is proposed to use this effect to detect gravitational waves. The amplitude of the wave can be estimated by applying recently developed relativistic quantum metrology techniques. The optimal precision bound on the estimation of the wave's amplitude is provided. Finally, it is shown that the parameter regime required to detect gravitational waves with this technique could be, in principle, within experimental reach in a medium-term timescale.

M. Ahmadi, D. E. Bruschi, C. Sabín, G. Adesso and I. Fuentes, Sci. Rep. 4, 4996 (2014) presents a framework for relativistic quantum metrology, in which techniques for the application of metrology to quantum field theory are introduced. This framework allows for high precision estimation of parameters that appear in quantum field theory including proper times and accelerations.

C. Sabin, J. Kohlrus, D. E. Bruschi and I. Fuentes, EPJ Quantum Technology 3, 8 (2016) builds on the knowledge that quasiparticles in a Bose-Einstein condensate are sensitive to space-time distortions, and that gravitational waves can induce transformations on the state of phonons that can be observed through quantum state discrimination techniques. This papers shows that this observation method is highly robust to thermal noise and depletion. A bound on the strain sensitivity is derived that shows that the detection of waves in the kHz regime is not significantly affected by temperature in a wide range of parameters that are well within current experimental reach.

It is an object of the current invention to provide an alternative quantum gravimeter that exploits the relativistic effect of phonon creation by gravitational waves.

SUMMARY OF THE INVENTION

According to a first aspect of the invention we provide a method of measuring a gradient of a field (such as a gravity gradient) using one or more trapped BECs, each having a density distribution, and at least two atomic modes within those BECs; wherein the density distributions of the one or more BECs are modified by the field, which leads to a change of the atomic modes' time evolution; wherein the method comprises:
  selecting two atomic modes that are differently affected by the field;
  measuring a field-induced difference between the selected atomic modes; and
  using the measured field-induced difference to infer a gradient of the field.

The field may be a gravitational field, and the field induced difference between the two modes may comprise a field-dependent phase. Alternatively, or additionally a number of excitations may be exchanged between the modes or created within one or both of the modes.

The method may comprise using a single trapped BEC having a density distribution that is perturbed by the external field. The two differing modes (e.g. two modes whose field-induced phase differs) may be selected from modes existing in the single BEC.

Each atomic mode may be defined by an angular momentum quantum number and a magnetic quantum number. Measuring the field induced phase difference between two modes may involve selecting two modes with the same angular momentum quantum number, but with differing magnetic quantum numbers. The magnetic quantum numbers of the selected modes may differ by one.

The or each BEC may be trapped in a trapping potential. The trapping potential may comprise an electromagnetic portion and a field-induced portion. The field-induced portion may be due to a gravitational field, which may be caused by a mass distribution in the vicinity of the BEC. The mass distribution may cause a distortion in the shape of the BEC.

The two modes may be at an angle to each other, such that the distortion in the shape of the trapping potential causes the two modes to have differing effective lengths. The two modes may be perpendicular to each other.

The electromagnetic portion of the trapping potential may be a harmonic trapping potential. The gravitational field may add a linear term to the electromagnetic portion of the trapping potential.

A plurality of independent consecutive measurements of the phase difference may be taken. The measurements may then be averaged to produce an averaged phase difference. This averaging may improve the accuracy of the final result.

The one or more atomic modes within the BEC may be prepared in a squeezed state. This may result in a further improvement in the accuracy of the measurement.

According to a second aspect of the invention we provide a quantum gradiometer operable to perform the method of the first aspect of the invention.

According to a third aspect of the invention we provide a system for measuring a field gradient; the system comprising:

a trapped BEC having a density distribution, wherein the trapped BEC comprises a plurality of atomic modes, and wherein the density distribution of the trapped BEC is modified by the field;

a measurement system for measuring a field-induced difference between two selected atomic modes within the trapped BEC; and a processor for inferring a field gradient from the measured field-induced difference.

The field induced difference may be a phase difference between the modes, a number of excitations exchanged between the modes, or a number of new excitations created within one or both of the modes.

The system may be operable to perform the method of the first aspect of the invention, including optional features.

According to a fourth aspect of the invention we provide a method of measuring an acceleration due to a gravitational field using one or more BECs, wherein the one or more BECs include:
 a first mode propagating in/parallel to a first direction (e.g. between a first location (which may be a boundary) $\bar{r}_b$, and a second location (which may be a boundary) $\bar{r}_t$), wherein the first direction may be parallel to a direction of the acceleration due to the gravitational field; and
 a second mode propagating in/parallel to a second direction, different to the first direction, between a third location (which may be a boundary) $z_l$ and a fourth location (which may be a boundary) $z_r$, wherein the second direction may be perpendicular to the first direction and to the direction of the acceleration due to the gravitational field;

wherein the method comprises:
 measuring a phase difference between the first mode and the second mode; and
 using the measured phase difference to measure the acceleration due to the gravitational field.

Such a scheme is advantageous as is makes use of collective oscillations (i.e. modes) within the at least one BEC, rather than relying on atom interference. It can thus be made smaller than prior atom interferometers.

The first direction is, in most realistic scenarios, a vertical direction, and the second direction is thus a horizontal direction. The frequency in the vertical mode depends on the Schwarzschild radius, as the acceleration due to gravity causes a density perturbation in the BEC in the vertical direction, which has an effect on the frequency of the vertical mode. A phase difference between the modes thus can be used to provide information about the Schwarzschild radius (and therefore gravity).

The phase difference between the first frequency mode and the second frequency mode may be used to estimate the local Schwarzschild radius $r_s$.

The local gravitational field may be estimated from the local Schwarzschild radius $r_s$ using $$g = r_s c^2 / 2\bar{r}_b^2$$

where $\bar{r}_b$ is the radial height coordinate within the gravitational field.

The one or more BECs may have a uniform density when not under the influence of an external potential.

The method may further comprise condensing the at least one BEC in a trapping potential which is tuned to partially cancel the acceleration caused by the gravitational field, such that a density perturbation $\delta_p$ is created in the BEC.

The trapping potential may be given by $$\Delta V \approx \frac{m^2 c^2}{\hbar^2} \frac{r_S x'}{\bar{r}_b^2}$$

where $x' = x - \bar{r}_b$ and the corresponding relative density perturbation $\delta_p$ is given by $$\delta_p = \frac{1}{2} \frac{c^2}{c_{s0}^2} \left( \frac{r_S}{\bar{r}_b^2} - \frac{r_{S,0}}{\bar{r}_{b,0}^2} \right) \left( x' - \frac{x_t'}{2} \right)$$

The at least one BEC may be only one BEC, and the method may further comprise condensing a BEC having a first length $L_p$ extending along a first longitudinal axis between the first location (or boundary) $\bar{r}_b$ and the second location (or boundary) $\bar{r}_t$, and a second length $L_p$, extending along a second longitudinal axis between the third location (or boundary) $z_l$ and the fourth location (or boundary) $z_r$, wherein the second longitudinal axis is perpendicular to the first longitudinal axis. The second length is preferably equal to the first length.

Alternatively, the at least one BEC may comprise two BECs, and the first (vertical) mode may propagate in the first BEC, whilst the second (horizontal) mode may propagate in the second BEC.

The method may further comprise the steps of:
 condensing a first BEC in a first atom trap having a first length $L_p$ between the first and second locations (which may be boundaries) $\bar{r}_b$ and $\bar{r}_t$,
 condensing a second BEC in a second atom trap having a second length $L_p$ between the third and fourth locations (which may be boundaries) $z_l$ and $z_r$, the second length being equal to the first length,
 wherein the first mode propagates in the first BEC and the second mode propagates in the second BEC.

The or each BEC may be confined in a box potential. For instance, the first BEC may be confined in a first box potential and the second BEC may be confined in a second box potential. The first box potential may be effectively one-dimensional, with the mode being used in the analysis propagating along that one dimension. Similarly, the second box potential may be effectively one-dimensional, with the mode being used in the analysis propagating along that one dimension.

The length $L_p$ of each of the first and second BECs may be held constant by a respective rigid rod, and deformation of the rigid rod due to gravity may be taken into account for the first BEC. Such a deformation may be neglected for the second BEC.

The deformation of the rigid rod may affect the frequencies of the frequency modes through $$\omega_{v,k} \stackrel{def}{=} \omega_{h,k}(1+\Theta)$$

where $\Theta$ is a frequency shift.

The first mode may be a squeezed state. The method may further comprise creating a squeezed state for a first mode k of the first BEC.

The second mode may be a coherent state. The method may further comprise preparing a coherent state a second mode of the second BEC. The second mode of the second BEC may have the same mode number k as the squeezed mode of the first BEC.

The method may further comprise entangling the first and second modes.

A phase shift may be introduced between the first and second modes. The phase shift may be $\pi/2$.

The or each BEC may be modelled as a quantised field.

The first mode may be a phonon mode. The second mode may also be a phonon mode.

The spacetime of the or each BEC may be described using Schwarzschild geometry in order to calculate the acceleration due to gravity.

The phase shift may be used to determine the Schwarzschild radius using $$\omega_{h,k}^{def} = \frac{v\pi k}{L_p} f(r_b)^{1/2} \text{ and} \qquad (61)$$

$$\omega_{v,k}^{def} = \omega_{h,k}(1 + \Theta) \qquad (62)$$

where v and $\Theta$ are defined for the light cavity and the BEC respectively as $$\text{Light}\begin{cases} v = c \\ \Theta = \Lambda \end{cases}, \qquad (63)$$

$$\text{BEC}\begin{cases} v = c_{s0} \\ \Theta = \frac{3}{2}\Lambda - \frac{\delta_\rho'^2 L_p^2}{64} \end{cases}.$$

According to a fifth aspect of the invention we provide a quantum gravimeter comprising:
- a first BEC in a first atom trap having a first length $L_p$ between first and second locations $\bar{r}_b$ and $\bar{r}_r$,
- a second BEC in a second atom trap having a second length $L_p$ between the third and fourth locations $z_l$ and $z_r$,
- a measuring system operable to measure a phase difference between a first mode in the first BEC, the first mode propagating in a first direction between the first location $\bar{r}_b$ and the second location $\bar{r}_r$, and a second mode in the second BEC, the second mode propagating in a second direction between the third location $z_l$ and the fourth location $z_r$, wherein the first direction is parallel to a direction of the acceleration due to the gravitational field and wherein the second direction is perpendicular to the direction of the acceleration due to the gravitational field; and
- a processor operable to use the phase difference between the first mode and the second mode to measure the acceleration due to the gravitational field.

According to a sixth aspect of the invention we provide a quantum gravimeter comprising:
- a BEC having a first length $L_p$ extending along a first longitudinal axis between a first location $\bar{r}_b$, and a second location $\bar{r}_r$, and a second length $L_p$, extending along a second longitudinal axis between a third location $z_l$ and a fourth location $z_r$, wherein the first longitudinal axis is parallel to a direction of the acceleration due to the gravitational field and wherein the second longitudinal axis is perpendicular to the direction of the acceleration due to the gravitational field and to the first longitudinal axis;
- a measuring system operable to measure a phase difference between a first mode propagating in a first direction between the first location $\bar{r}_b$ and the second location $\bar{r}_r$, and a second mode propagating in a second direction between the third location $z_l$ and the fourth location $z_r$; and
- a processor operable to use the phase difference between the first mode and the second mode to measure the acceleration due to the gravitational field.

It will be appreciated that the features described above with respect to the method of the fourth aspect of the invention may be implemented in a quantum gravimeter according to the fifth aspect of the invention or the sixth aspect of the invention.

According to a seventh aspect of the invention we provide a quantum gravimeter/accelerometer operable to perform the method of the fourth aspect of the invention.

The technology described herein can be adapted to measure any acceleration, not just the acceleration due to gravity, and therefore according to an eighth aspect of the invention we provide a method of measuring an acceleration (e.g. that experienced when at rest in a linear gravitational potential) using one or more trapped BECs and at least two atomic field modes within those BECs; wherein the density distributions of the one or more BECs are modified by the acceleration, which leads to a change of the field modes' time evolution; wherein the method comprises:
- selecting two modes that are differently affected by the acceleration; and
- measuring an acceleration-induced difference; and
- using the measured acceleration induced difference to infer the acceleration.

The acceleration-induced difference may comprise one or more of:
(i) an acceleration dependent phase;
(ii) a number of excitations exchanged between the modes;
(iii) a number of new excitations created within one of the modes, or both of the modes.

The two modes may be at an angle to each other, such that the acceleration causes the two modes to have differing effective lengths. The two modes may be perpendicular to each other, for example, the two modes may comprise a mode that is parallel to a direction of the acceleration and a mode that is perpendicular to a direction of that acceleration.

The acceleration may be an acceleration due to gravity, and thus the method of the eighth aspect of the invention may be combined with any of the method steps of the fourth aspect of the invention if required.

The above methods may also be used to measure/analyse the field gradient (e.g. a gravity gradient) rather than the acceleration due to a field. Density variations in one or more BECs caused by a field can be used to infer a local gradient of that field by measuring a phase difference between two differently oriented modes within the one or more BECs. The techniques of the $4^{th}$-$8^{th}$ aspects of the invention may thus be combined with the techniques of the $1^{st}$-$3^{rd}$ aspects of the invention.

BRIEF DESCRIPTION OF THE DRAWINGS

Aspects of the invention will now be described in more detail, by way of example only, with reference to the accompanying drawings, in which FIG. 1 schematically illustrates a quantum gravimeter.

DETAILED DESCRIPTION

We have developed a measurement scheme that changes the paradigm on how field effects, particularly gravitational effects, are measured using quantum systems. Our scheme overcomes limitations due to time of flight constraints by using the effects of a field, such as gravity, on collective excitations (called phonons) of static and oscillating Bose-Einstein condensates (BECs). Two exemplary measurement schemes are described below. First, a system and method for measuring an acceleration due to a field (e.g. gravity) is summarised. Second, a system and method for measuring a field gradient (e.g. a gravity gradient) is summarised. Both methods are then described mathematically in more detail in the sections that follow.

Gravimeter

Figure 1:
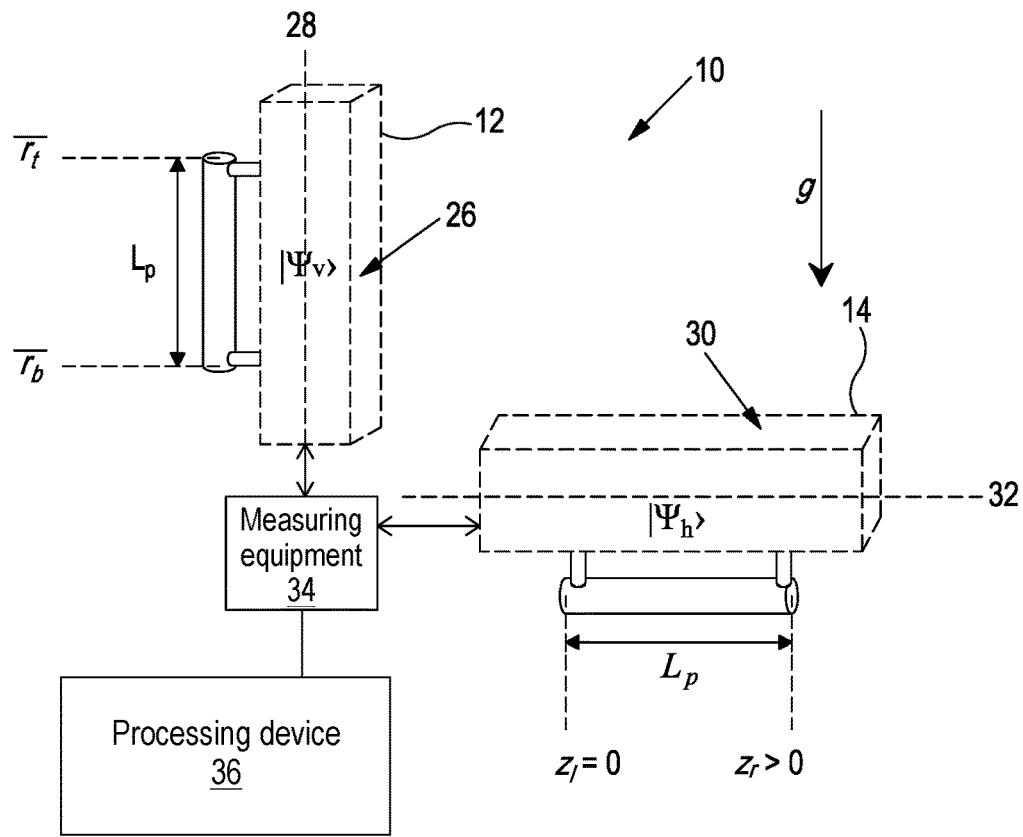

An example system for measuring an acceleration due to a field is schematically illustrated in FIG. 1 as gravimeter 10. The gravimeter 10 may be used to very accurately measure an acceleration due to a gravitational field (proper acceleration in this case matches gravitational acceleration).

The gravimeter comprises at least one, and preferably first and second atom traps 12, 14, which are perpendicular to one another. The first atom trap 12 is aligned with a direction of an external acceleration to be measured, in this case acceleration due to gravity, indicated in FIG. 1 by the arrow g. The first atom trap is thus aligned along a direction that is radial to a surface of a body causing the gravitational acceleration which is to be measured (e.g. the Earth), and so for most purposes the first atom trap is substantially vertical. The second atom trap 14 is perpendicular to the first atom trap 12, and hence perpendicular to the acceleration being measured. For most purposes the second atom trap is substantially horizontal.

Each of the atom traps 12, 14 contains, when in use, a Bose Einstein condensate (BEC) confined within a trapping potential. A BEC is a state of matter comprising bosons, in which a large fraction of the bosons occupy the lowest quantum state. A BEC may be formed by cooling a dilute gas of bosons below a critical temperature, very close to absolute zero (−273.15° C.). Methods of forming BECs are well known in the art, and so will not be discussed in further detail herein.

Each of the BECs in the gravimeter shown in FIG. 1 has a constant atomic density (when not under the effect of an external field, such as gravity) and is confined within an effectively one-dimensional trapping potential having rigid boundary conditions and a known, constant, proper length $L_p$. The first trap 12 contains a first BEC 26 having a first proper length $L_p$ extending along a first longitudinal axis 28 between a first rigid boundary $\bar{r}_b$ and a second rigid boundary $\bar{r}_t$. Similarly, the second trap 14 contains a second BEC 30 having a second proper length $L_p$, equal to the first (when not experiencing relativistic effects), and extending along a second longitudinal axis 32 between a third rigid boundary $z_l$ and a fourth rigid boundary $z_r$.

Measuring equipment 34 is operable in use to measure a phase difference between first frequency of a first mode of the first BEC 26 and a second frequency of a second mode of the second BEC 30. A processing device 36 is operable to infer information about the local gravitational field from the frequency difference, and in particular from the difference in the modification of the frequencies of the modes due to the difference in the modification of the BEC density induced by acceleration/gravity, as explained in more detail below.

In particular, the gravimeter may be used to measure the Schwarzschild radius (ie. the product $2GM/c^2$ where G is the gravitational constant and M the mass) due to a gravitational field. The gravimeter relies on using the effects produced by the spacetime of the Earth (or by gravity) on the quantum states of a phononic quantum field and the bulk (i.e. the atoms in the ground state, also referred to as "atomic density") of a BEC. These effects include a perturbation in the atomic density of the vertically oriented BEC that is due to the gravitational field.

In previous quantum gravimetry methods atom-atom interactions are considered as a systematic effect. In contrast, in this method we use two-body collisions that give rise to entanglement between atoms and matter wave vibrational modes (called "phonons", which correspond to excitations also referred to as "density fluctuations"). In the absence of collisions there are no phonons. The reason why we use two-body interactions is because the dynamical evolution of phononic modes that they produce is affected by gravity.

The gravitational field affects the frequencies of these modes through the quantised field equation $$\hat{\psi}_h(x^0, \bar{z}) = \sum_k \{\hat{a}_{h,k}\phi_{h,k}(x^0, \bar{z}) + \hat{a}^\dagger_{h,k}\phi^*_{h,k}(x^0, \bar{z})\}, \quad (24)$$

The solutions to this equation are plane waves $\phi_{h,k}$ (k indicates the mode number) that have frequencies which depend on the height in the gravitational field x, the Schwarzschild radius $r_s=2GM/c^2$ (where c is the speed of light), the length of the BEC Lp and the effective speed of sound $c_s$ (ie. the atomic mass, density and the strength of the interactions (scattering length). Information about the local Schwarzschild radius $r_s$ (and thus the local gravitational field) can therefore be obtained by analysing the frequencies of phonon modes within a BEC.

The Schwarzschild radius is defined as:

$$r_s=2GM/c^2 \quad (A)$$

The local gravitational field g can be obtained using $$g=GM/r^2 \quad (B)$$

Replacing GM in equation (B) gives $$g=r_s c^2/2r^2 \quad (C)$$

where r is the radial height coordinate within the gravitational field. The local gravitational field can thus deduced from the local Schwarzschild radius using equation (C).

Further details explaining why there is field information encoded in the difference between the frequency modes, and how that information may be extracted, is provided in the detailed discussion below (headed DETAILED DISCUSSION: GRAVIMETER). First, however, we give further information on an example experimental set-up.

Figure 2:
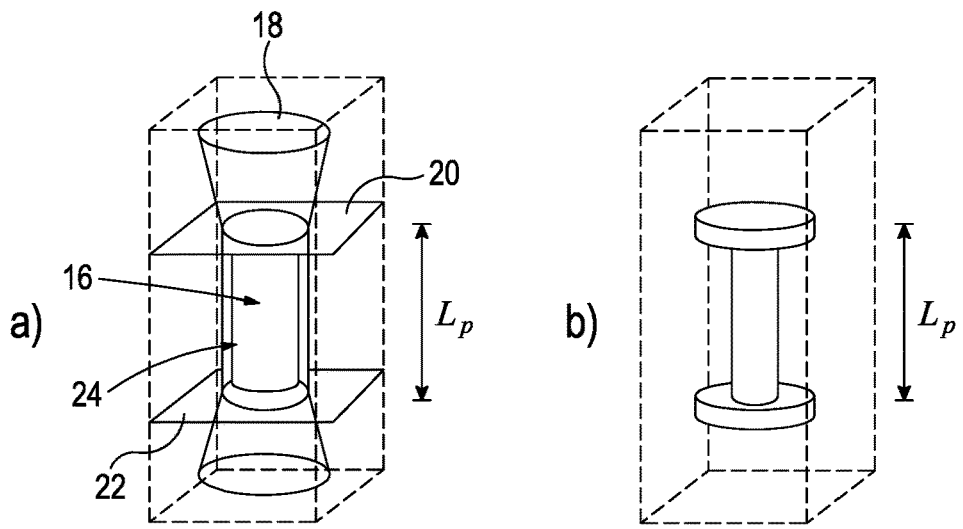
FIG. 2 schematically shows a) an effective uniform Bose-Einstein condensate (BEC) confined within a 1-dimensional box potential, and b) as a comparison for the BEC case, an effectively 1-dimensional light field confined using mirrors.

An example of a one-dimensional trap 16 suitable for use in the gravimeter of FIG. 1 is the "box trap" shown in FIG. 2. The box trap is formed using one hollow tube laser beam 18 and two sheet laser beams 20, 22, which together create a repulsive potential 16 for the atoms within the trap. The atomic cloud is confined by the three beams to the dark cylindrical trapping region 24, which can be considered effectively one-dimensional for our purposes in that the trapping region 24 is very small in two dimensions and much longer in a third dimension, which corresponds to the length Lp of the trapping region 24. Such a set-up allows us to assume that the BEC is only excited for momenta in the longitudinal dimension (i.e. the dimension having length Lp). It will be appreciated that there are multiple ways to make such a potential, and this is an example only. Other types of potential (e.g. a harmonic potential) could also be used, if required.

An atom trap of the type discussed above can be created using 532 nm laser beams. With a total laser power of $P_0 \approx 700$ mW it is possible to achieve a trap depth of $V_0 \approx k_B \times 2$ $\mu K$ (where k is the Boltzman constant). Further details of the construction of an appropriate atom trap can be found in A. L. Gaunt, T. F. Schmidutz, I. Gotlibovych, R. P. Smith, and Z. Hadzibabic, Phys. Rev. Lett. 110, 200406 (2013).

A first BEC 26 may be condensed within the first atom trap 12 using standard cooling techniques. Similarly, a second BEC 30 may be condensed within the second atom trap 14 using standard cooling techniques.

Accuracy may be improved by, for the vertical BEC, creating a squeezed state for a mode k (the method works with other states but is improved by using squeezed states). Squeezing phonons can be done by several methods that are well known in the art (such as changing the length of the trap, adding an electromagnetic potential, etc).

For the horizontal BEC, a mode within the same mode number k can be prepared in a coherent state (although a squeezed or other state can also be used if preferred). Note that the horizontal mode can have a different mode number, but it is more convenient mathematically to use the same mode number. Indeed, the horizontal "mode" could be the bulk of the BEC rather than a phonon mode, which may result in greater sensitivity (since the number of atoms can be much higher in the bulk, and the bulk is usually in a coherent state).

As explained above, the gravimeter is oriented with the first longitudinal axis aligned with the direction of the acceleration due to the gravitational field (i.e. vertical/ radial), and the second longitudinal axis perpendicular to the first (i.e. horizontal, or alternatively tangential). Information about the gravitational field is encoded within the vertical mode, but not in the horizontal mode (as will be explained below)

The horizontal BEC is located adjacent an end of the vertical BEC. In the example shown the horizontal BEC 30 is located adjacent a lower end of the vertical BEC 26. In particular, the longitudinal axis 32 of the horizontal BEC is located at the same vertical coordinate as the lower boundary $\bar{r}_b$ of the vertical BEC. Alternatively, the horizontal BEC may be located at the upper boundary $\bar{r}_t$ of the vertical BEC. As explained in more detail below, the accuracy of the gravimeter is increased when the horizontal BEC is located at an end of the vertical BEC; however other locations are possible if required, with the exception that the horizontal BEC may not be located halfway along the vertical BEC (i.e. at $\bar{r}_b + L_p/2$)—further details as why this is the case are provided below.

Each BEC 26, 30 is confined within an atom trap which confines the atoms within the trap in a trapping potential $V_0$ created by the box trap arrangement of lasers. The gravitational field of the Earth affects the atomic density in the vertical box potential $V_0$, such that it will not remain uniform unless the effect due to the Earth's gravitational field is cancelled out. We can assume that the gravitational field has no effect on the horizontal box potential $V_0$ because the potential is effectively one-dimensional and perpendicular to the direction of the gravitational field, meaning the horizontal potential experiences no force due to the gravitational field in its longitudinal dimension.

A linear electromagnetic potential $\Delta V$ is applied to the vertical trap 12 (for example by applying a magnetic field of the right strength) in order to cancel out the effects of the external gravitational field. In particular the linear potential $\Delta V$ is applied to the vertical BEC 26 that cancels the effect of the gravitational field on the bulk of the atoms within the BEC. The field is typically cancelled up to second order in $r_s\sqrt{r_b}$ and $x\sqrt{r_b}$ (where x is the radial (i.e. vertical) coordinate and $\bar{r}_b$ is the position of the lower boundary in isotropic Cartesian coordinates—discussed in more detail below), and up to the first order in their product. Therefore the density will be uniform to that order. In practice, an experimentalist may tune the gradient of the linear potential $d\Delta V/dx$ such that the density is homogeneous.

Alternatively, we have found that $d\Delta V/dx$ can also be fixed to a value that differs slightly from the value necessary to cancel the full effect of the gravitational field. This difference leads to a density perturbation in the first BEC 26. We can use this perturbation to increase the accuracy of our estimate of the Earth's spacetime parameters, as explained in more detail below.

The accuracy of the estimate may also be increased by taking into account the effects of length distortion in the vertical direction due to the gravitational field. Again, this effect may be disregarded in the horizontal direction.

Many techniques exist for the measurement of the atomic mode frequencies, for instance counting the phonon difference in each mode (vertical and horizontal), dual parameter estimation, parity measurement or using Bayesian protocol.

A variant of the method is that instead of using two separate one dimensional BECs, one could instead use a single BEC in a three-dimensional box potential and use two modes in that single BEC, one horizontal mode in a coherent state and one vertical mode in a squeezed state It will be appreciated that the two modes do not need to be vertical and horizontal, nor do they need to be perpendicular to one another. The arrangement shown in FIG. 1 is useful in that the mathematics may be simplified (as described more below) but other modes may be used if required. Any two modes that are differently affected by the field being measured may be selected if required.

A third variant of the method, which can also be implemented using either two separate BECs or a single BEC in a three dimensional box involves transferring excitations between the bulk and the two selected phononic modes (e.g. vertical and horizontal) using a beamsplitter gate and extra phase shift.

Many techniques exist for the measurement of the output of 30, for instance counting the phonon difference in each mode (vertical and horizontal), dual parameter estimation, parity measurement or using Bayesian protocol.

A fourth variant of the method, which can be implemented using either two separate BECs or a single BEC in a three dimensional box, is a pumped SU(1,1) scheme which involves transferring excitations between the bulk and the phononic modes using for example tritter gates and parametric amplification. Other gates mixing excitations between the bulk and phononic modes can be also used Contrary with atom interferometry where interactions are avoided, the gravimeter described above takes into account two-body collisions.

In the example implementation discussed above the BEC measures 100 μm, therefore, our design can be implemented with state of the art table top technologies (including laser system and vacuum chamber) but soon this technology will be miniaturised into chips. The phononic field can be cooled down to 0.5nK making the device highly sensitive.

Current quantum gravimeters are based on non-relativistic quantum mechanics and cannot be employed to measure gravity beyond the Newtonian regime because quantum theory and general relativity are incompatible theories. This theoretical framework enables the description of both quantum theory and general relativity in a consistent way. The detection scheme relies on the deformation of the BEC (a relativistic effect) produced by the gravitational field of the Earth on a Bose-Einstein condensate consisting of atoms cooled below the nano-Kelvin regime. Vertical deformation produces an observable effect on the phononic modes of the BEC as compared to longitudinal modes. These differences between the vertical and longitudinal modes are observable and can be used to estimate the local gravitational field.

Note that BECs are also used in atom interferometry for high precision experiments. However in atom interferometry, the wave function of single atoms is brought into interference with itself; no collective phenomenon is used, while phonons in BECs are the quasi-particles of collective oscillations of atoms.

Such a gravimeter can be used to measure the proper acceleration and/or the Schwarzschild radius of the Earth. As discussed in significantly more detail below, the basis of the measurement is the difference of the fundamental frequency of phonon modes in differently oriented BECs (or in differently oriented modes within a single BEC) due to the deformation of the length of the trapping potential of the BEC (or the length of the cavity). The relative error bound for the estimation of the Schwarzschild radius on the length scale of 200 μm is $10^{-8}$ in one run (6 seconds) and $10^{-11}$ if one integrates over a year. This compares very well with commercial atomic quantum gravimeters that reach relative errors of $10^{-9}$ in 15 days with a device that measure 100×50×70 $cm^3$. The gravimeter discussed herein has the advantage that the device can be miniaturised without losing precision and can be employed to measure field strengths beyond the Newtonian regime.

Gradiometer

Another application for BECs is in gradiometry, that is, to measure differential forces due to a field gradient, such as a gravity gradient.

Figure 6:
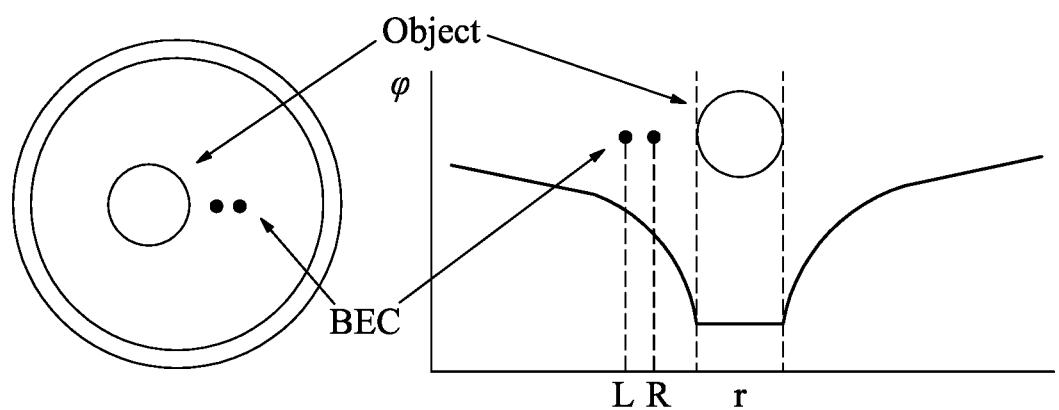
FIG. 6 sets out a schematic proposal for a detector
Figure 6:
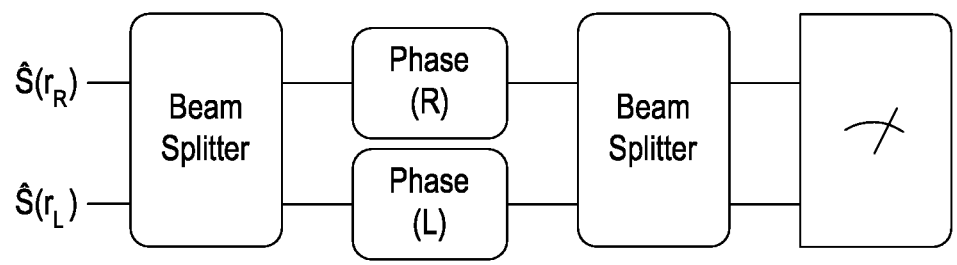

FIG. 6 shows a basic scheme for a ground state interferometer. A BEC is split into two clouds and then recombines to interfere. The interference measures any field gradient due to an object and constrains deviations from general relativity (e.g. fifth force models). Such a detector has a long integration time: atoms can be held near the object for a longer time than with a ballistic scheme.

However, the measurement sensitivity can be improved using collective quantum BEC excitations, as demonstrated in the present invention. An initially squeezed phonon state has better phase estimation and error scaling than any classical state.

Figure 7A:
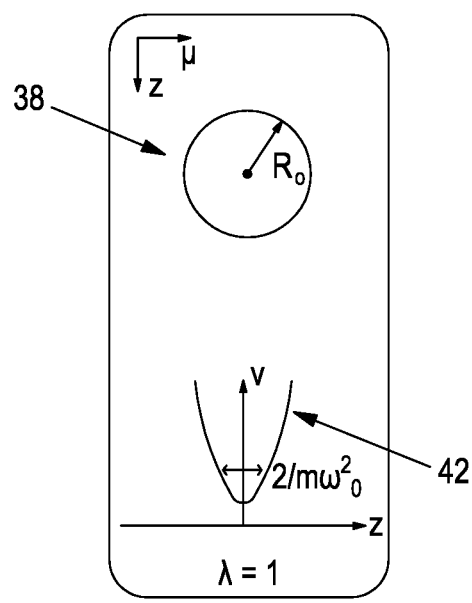
FIGS. 7a and 7b show the effects of a gravitational mass distribution on the BEC

FIG. 7a shows a BEC 38 trapped in a potential, which in this case is a spherically symmetrical, harmonic trapping potential 42. Such a potential may be generated by light and/or magnetic fields in a known manner. A BEC 38 in such a trapping potential has a known initial spatial density distribution, which in this case is a density distribution that varies parabolically with distance from the centre of the trap. The BEC can thus be considered to be a sphere having a substantially constant radius $\mathscr{R}_o$. Atomic field modes can exist with such a trapped BEC. Atomic field modes (also referred to as phonons) are collective oscillations of the atoms in a BEC 38 with well-defined (quantised) energy levels.

If an arbitrary mass distribution 46 is placed in the vicinity of the BEC 38, the BEC 38 will deform due to the gravity exerted by that mass. This deformation changes the properties of the BEC, in particular the atomic mode structure of the phonon field.

Typically, using the present scheme one can measure a 20 mg mass at the distance of 1 mm with a good signal to noise ratio. For every three orders of mass increase, one gets one order of magnitude increase in distance (e.g. 20 kg at a distance of 1 m, and 20 tonnes at a distance of 10 m).

A gradient of the field causing the deformation (i.e. a gradient of the gravitational field) may be determined by measuring a phase difference between two atomic field modes that are differently affected by the field. Such modes may be, for example a first mode that is at a first orientation (e.g. parallel) with respect to a selected axis along which a field due to the mass distribution acts, and a second mode that is at a second, different, orientation (e.g. perpendicular) to that axis. As the BEC is extremely cold there are only a few thermal excitations of the phonon field, which represent the noise background on which we measure.

Figure 7B:
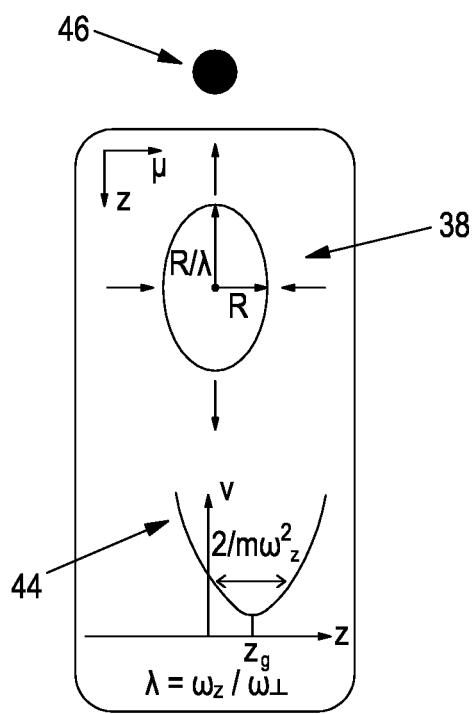

FIG. 7b shows the BEC 38 after it has been deformed due to a mass distribution 46 in the vicinity of the BEC 38, in this case a spherically symmetric, homogenous mass distribution. The mass distribution causes a force to act on the BEC along a known axis (shown in this example as the z-axis). The presence of the mass distribution 46 thus adds a gravitational (Newtonian) potential to the original trapping potential 42, resulting in a new trapping potential 44 with its centre shifted by amount $z_g$ along the z-axis, as shown in FIG. 7b. As a result, the centre of mass of the BEC 38 is also shifted by amount $z_g$ along the z-axis. Furthermore, the trapping potential 44 profile is also broadened along the z-axis, when compared to the profile of the original trapping potential 42. The overall effect is that the BEC 38 is elongated (or deformed) along the z-axis, and assumes a spheroidal shape having a second, deformed, density distribution (which is in this example also a parabolic distribution). The radius of the trapped BEC thus can no longer be considered substantially constant, but instead varies between a maximum radius $\mathscr{R}/\lambda$ (which is along the direction parallel to the field due the mass distribution, i.e. the z-axis) and a minimum radius $\mathscr{R}$ perpendicular to the direction of that field).

The spheroidal shape and the parabolic density distribution of the BEC 38 give rise to a well-defined set of atomic field modes within the BEC that are different to the field modes in an unperturbed BEC. Those perturbed atomic field modes, and in particular the angular frequencies/wavelengths of those modes, encode information about the gravity gradient.

One approach to determine gradient information about the field that is perturbing the BEC from a perturbed BEC is to select any two arbitrary modes of the perturbed BEC 38. The two modes can be allowed to evolve for a fixed time interval, and then the phase difference can be measured experimentally to reveal the gravity gradient. Therefore, one of the modes effectively serves as a reference for the other. As discussed in more detail below, such a system works effectively if the two selected modes have the same total angular momentum quantum number, but have magnetic quantum numbers that differ (e.g. by one).

In the specific scheme illustrated, of a BEC in a harmonic trap, information about the field gradient can thus be determined by considering phonons with two specific angular momentum quantum numbers. Any two phonons modes with different angular momentum quantum numbers may be selected. In one example, we select modes with angular momentum projected in the z-direction l and l−1, where l is the absolute (total) value of the angular momentum of both modes. For these modes, the frequencies are known when the BEC is deformed (ellipsoidal) in the z-direction.

These frequencies in the gravitational field of a sphere are:

$$w_{l,l} \approx \sqrt{l}(\omega_0 + GM/2R^3\omega_0)$$

and $$w_{l,l-1} \approx \sqrt{l}[\omega_0 + (l-3)GM/2lR^3\omega_0].$$

We see that what appears is $\epsilon_{grad} := 2 MG/R^3$ which is the gravity gradient. The phase is given as $\phi = \omega t$ and the gravity gradient can be measured through measuring the phase. Here, t is the total time evolution of the phonon modes.

Then, the principle limit on the precision of a measurement of the gravity gradient through this phase is given by $$\delta_{\epsilon_{grad}} = \frac{2\omega_0^2}{a(l)\epsilon_{grad}} \frac{1}{\sqrt{l}w_0 t \sqrt{2Nn(n+1)}}, \quad (2)$$

A specific way to access the phase of the phonon modes could be let these modes interfere. This is described in equation (3) giving the frequency difference between the two modes:

$$\Delta\omega_l = \omega_{l,l} - \omega_{l,l-1} \approx \frac{3\epsilon_{grad}}{4\sqrt{l}\omega_0}. \quad (3)$$

The frequency difference would lead to an accumulated phase difference between the modes of $\Delta\phi_l = \Delta w_l t$, which is the parameter to be measured experimentally. We can obtain an absolute sensitivity of $10^{-8}$ s$^{-2}$ for gravity gradient measurements using this scheme.

However, it can be appreciated that the present invention is not limited to measuring only the phase difference of the two phonon modes whose frequencies are dictated above—other modes can be selected. It can also be appreciated that not all phonons modes may have an analytical representation. In such cases, numerical methods may be employed to order to obtain the relevant parameters, such as the frequencies of the modes.

There exist many methods of extracting the phase difference. For example, in order to experimentally measure the phase difference, one can either try to measure the phase difference directly by allowing the modes to interfere, as mentioned above, or to infer the phase difference of the modes separately by measuring, for example, the density of the BEC 38 and then calculating the phase difference from this.

Figure 8:
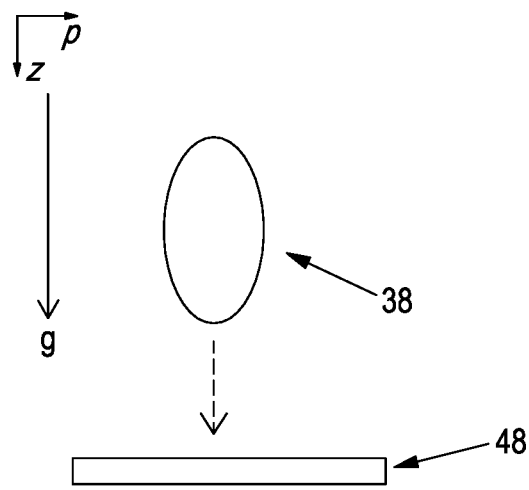
FIG. 8 illustrates a scheme for measuring density of a BEC.

One method of calculating the phase difference between phonon modes by measuring the density of a BEC comprising the modes has been termed 'heterodyne detection' by some authors, and is illustrated in FIG. 8. After the modes are excited in the BEC 38, the trapping potential is switched off and the BEC starts to expand and fall freely under gravity. During the expansion the energy contained in the phonons is transformed into the kinetic energy of atoms. These particles may interfere with the atoms in the ground state within the BEC 38 to produce periodic density modulations which can be measured using a detector 48. In the present invention, the periodic density modulations can result from interference of the atoms that have derived their kinetic energy from two different modes of the BEC. Thus, these density modulations contain the information about the phase difference of the phonons. Information about the local gravitational field gradient can be inferred from the phase difference, as discussed above.

It is also possible to control the phonon-phonon interactions in the BEC with Feshbach resonances via manipulation of the BEC's shape, enabling multi-mode operations that can be used for the implementation of Mach-Zehnder interferometer (MZI) schemes. The controlled coupling of the phonons is equivalent to a beam splitter in the MZI, and thus, can be used to infer the phase or phase difference of the phonons directly.

Typically, the measurements made using the above methods are carried out multiple times. The measurements are then averaged to produce an average phase difference, to improve accuracy of the final result.

Further improvement in accuracy is obtained if phonons are created in a squeezed state. Squeezing could be achieved by periodically changing the shape of the BEC (for example by modulating the trapping potential) or the atom-atom interaction strength of the BEC.

Figure 9:
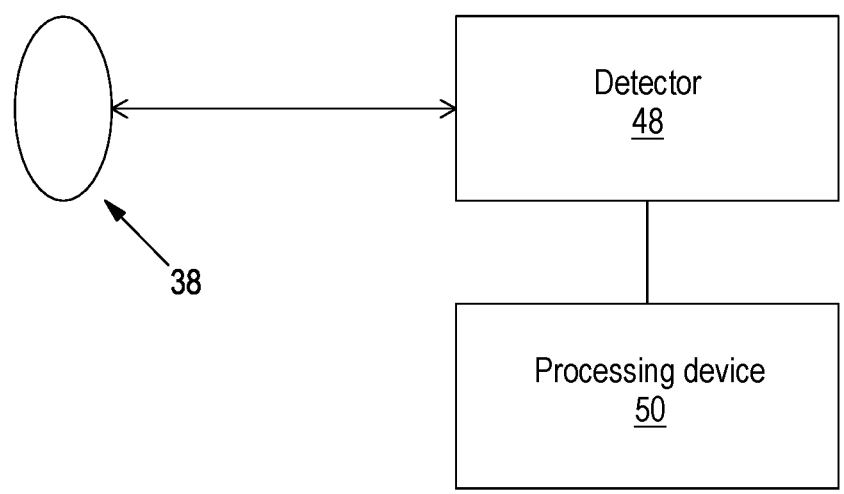
FIG. 9 schematically illustrates a quantum gradiometer.
Figure 10:
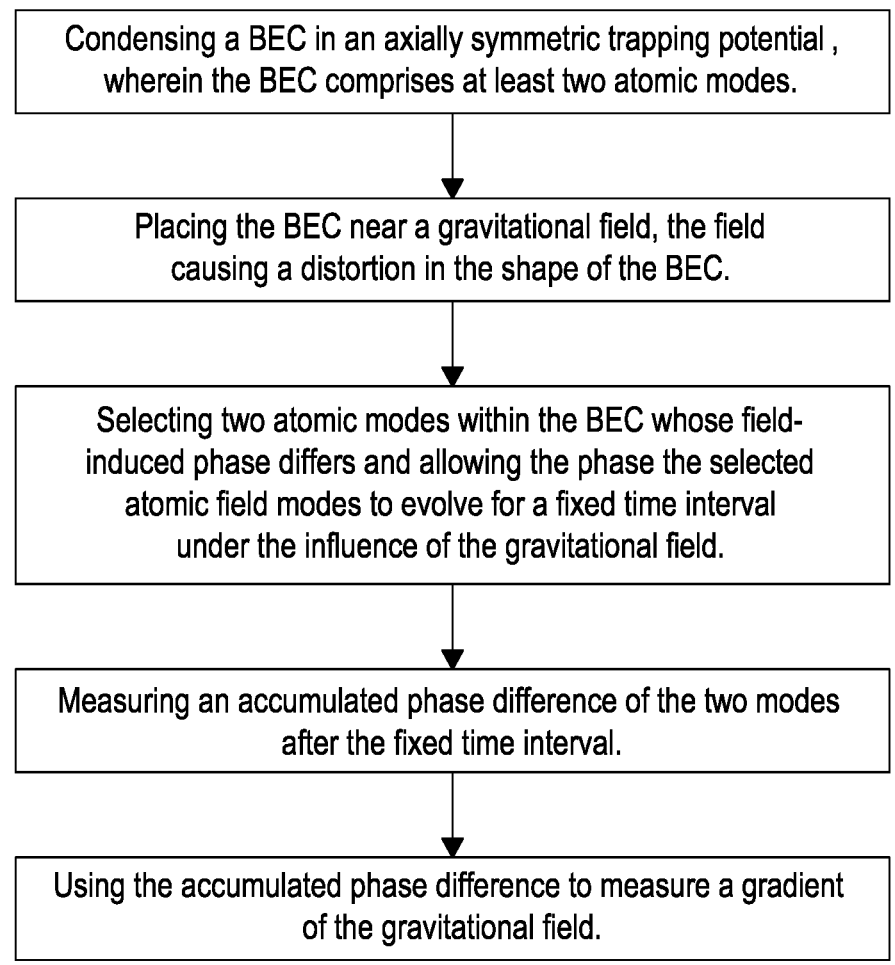
FIG. 10 sets out steps of a method of measuring a field gradient.

FIG. 9 shows an exemplary gradiometer which implements the methods discussed above. A BEC 40 is trapped in a trapping potential and is deformed by an external field acting in the direction F. Measuring equipment 48 is operable in use to measure a phase difference between a first mode of a perturbed BEC 38 and a second differently oriented mode of the same BEC. A processing device 50 is operable to infer information about the gradient of the field perturbing the BEC from the measured phase difference.

As an alternative to the schemes discussed above, two BECs could be used (similar to the gravimeter scheme discussed above), where one of the BECs is perturbed by the field whilst the other BEC is not perturbed, or is differently perturbed. A method and system for extracting the gravity gradient information would then involve measuring the phase differences between two modes, one 'reference' mode in the unperturbed BEC and another 'probe' mode in the perturbed BEC, both of which are allowed to evolve for a fixed time interval. The reference mode may be a selected mode k of the unperturbed BEC, and the probe may be the same mode k (i.e. with the same angular momentum quantum number and magnetic quantum number), but of the perturbed BEC. As explained above, the phase difference could be extracted by allowing the modes to interfere.

Detailed Discussion: Gravimeter

Section I. Summary of Detailed Analysis

The theoretical framework underpinning the gravimeter described above is discussed in the pages below. Besides the phonon field in a BEC, we consider a light field in a 1-dimensional optical cavity to compare with. In particular, we study the frequency spectrum of the quantum fields when they are kept at a fixed height above the ground in a laboratory on the surface of the earth. This situation corresponds to a proper acceleration that matches the gravitational acceleration. We consider two orientations of the BEC/cavity, horizontal and vertical, that lead to different effects on the frequency spectrum. The time evolution of any mode of the light field/phonon field can be used as a clock. We derive bounds for the precision of these extended clocks and discuss the effect of time dilation and proper acceleration. The influence of time dilation on the evolution of the extended clocks can be used for the estimation of gravitational red shift and the Schwarzschild radius of the earth by comparing the readings of two clocks at different height. We give limits for the precision of such measurements. The proper acceleration of the extended clocks matches the gravitational acceleration. Therefore, the different effect of proper acceleration on the clocks in horizontal and vertical orientation can be used to infer the Schwarzschild radius of the Earth locally. We derive the principle limitation for such a measurement. We also present an experimental setup that can be used to approach the principle bound for the local estimation of the Schwarzschild radius: modes of the quantum field in differently oriented BECs/cavities are brought into interference in a Mach-Zehnder interferometer (MZI) type setup.

The description below is organised as follows: in Section II we present the physical set-up; a hovering 1-dimensional BEC/cavity in the gravitational field of the Earth. In Section III, we introduce our model of a 1-dimensional BEC in the gravitational field of the Earth and we introduce the phonon field which serves as the counterpart to the light field in an optical cavity, as well as the deformation of the density due to gravity. The quantisation of both the phonon field in a BEC and the light field in a cavity, is presented in Section IV and the frequency spectrum is derived for horizontal and vertical orientation. In Section V, we derive the effect of gravity on the length of the BEC/cavity in the vertical orientation. This leads to an additional change of the frequency spectrum that we compare with the relativistic effect. Additionally, we consider the cavity as an extended clock and we apply methods of quantum metrology to provide bounds on the precision for the estimation of proper time. Furthermore, we give the precision for the estimation of red shift and the Schwarzschild radius by independent measurements at different heights. In Section VI, we introduce local estimations of gravitational accelerations, i.e. the Schwarzschild radius, with two differently oriented BECs/cavities. Finally, in Sec. VII we propose a Mach-Zehnder interferometer-like setup, which can in principle approach the precision bound. A summary, conclusion and an outlook on possible applications and future work are given in Section VIII.

The conventions used herein are the following: the metric signature is (−, +, +, +) in 3+1-dimensions and (−, +) in 1+1 dimensions. We use the symbol Tp for transposition when convenient to distinguish it from time.

Section II. The Hovering 1-Dimensional Cavity

Effects of earth rotation and deviations from spherical symmetry can be safely ignored for our purposes. Therefore, we describe the spacetime surrounding the earth using the Schwarzschild geometry, which is given as $$g = \text{diag}\left(-f(r), \frac{1}{f(r)}, r^2, r^2\sin^2\vartheta\right), \quad (1)$$

in spherical Schwarzschild coordinates ($x^o$, r, ν, φ). Here, $x^o$=ct, $f(r)=1-r_s/r$, the Schwarzschild radius is given as $r_s:=2GM/c^2$, the parameter M is the mass of the planet and G is the gravitational constant. For our purposes it is useful to consider the transformation of the Schwarzschild metric in Eq. (1) to the isotropic Cartesian coordinates ($x^o$x, y, z). With $r=(1+r_s/4\bar{r})^2\bar{r}$ where $\bar{r}=(x^2+y^2+z^2)^{1/2}$ we arrive at the Schwarzschild metric in isotropic spherical coordinates. After a the usual transformations from spherical to Cartesian coordinates, we find $$g_{\mu\nu} = \left(1 - \frac{r_S}{4\bar{r}}\right)^4 \text{diag}\left(-\frac{\left(1 - \frac{r_S}{4\bar{r}}\right)^2}{\left(1 - \frac{r_S}{4\bar{r}}\right)^6}, 1, 1, 1\right). \quad (2)$$

Note that the coordinate transformation from the Schwarzschild coordinates to the isotropic coordinates is time independent. Therefore, any point at a fixed coordinate position in Schwarzschild coordinates stays at a fixed coordinate position in isotropic coordinates. Hence, there is no additional proper acceleration introduced by fixing the coordinate position in the new coordinate system.

The Schwarzschild radius of the earth is of the order of 9 mm, while the distance to its center is of the order of 10 m. Therefore, we can expand the metric (2) in orders of $r_s/\bar{r}$. In second order in $r_s/\bar{r}$, we find $$g_{\mu\nu} = \eta_{\mu\nu} + \frac{r_S}{\bar{r}}\text{diag}(1, 1, 1, 1) + \frac{r_S^2}{2\bar{r}^2}\text{diag}\left(-1, \frac{3}{4}, \frac{3}{4}, \frac{3}{4}\right), \quad (3)$$

where $\eta_{\mu\nu}$=diag(−1, 1, 1, 1). We will neglect contributions of higher order than $r_s^2/\bar{r}^2$ in the following. Note that the first two terms in the metric (3) can be associated with the Newtonian limit. They can be derived directly from the linearised Einstein equations and the energy momentum tensor for a non-relativistic point particle in the Lorenz gauge. Terms of order $r_s^2/\bar{r}^2$ are purely relativistic.

The system of interest is a massless scalar field ψ trapped inside a rectangular cavity. We assume that the cavity is very small in two dimensions and longer in the third one. Such a set-up can describe both, the electromagnetic field confined within an optical cavity or the phonon field inside a trapped BEC. In the latter case, the bulk of the BEC acts as a cavity for the phonons. In the following, we introduce the formalism in full generality and we then specialise to the phonon excitations in a trapped BEC.

We assume that the field is only excited for momenta in the elongated dimension and it is found, with good approximation, in the ground state with respect to the transversal dimensions. This assumption can be understood by considering the energy spectrum of the transverse dimensions; the energy difference between two states is inversely proportional to the length of the relevant dimension. The smaller the confinement, the larger the energy difference. Therefore, we can consider the field as effectively 1-dimensional.

For the purposes of demonstrating the mathematics, we consider the cavities hovering at a fixed distance from the surface of the Earth with two different orientations: a vertical (i.e. radial) one and a horizontal one, as shown in FIG. 1. We now assume the vertically oriented cavity to be placed along the x-axis with its lower (bottom) edge located at the position $\bar{r}_b$ and its higher (top) edge at $\bar{r}_t$. The horizontal cavity, on the other hand, will be located at $x=\bar{r}_b$. Due to the rotational symmetry in the y-z-plane, we can restrict our considerations to the horizontal orientation in z-direction. We set one edge of the cavity to $z_l=0$ and the other to $z_r>0$.

The edges of the cavity, as well as every other component of the cavity, do not follow geodesics and therefore must have an outward pointing four-acceleration. We anticipate that this will result in a measurable difference between the time evolution of the fields in the vertical and the horizontal orientation.

We will proceed by considering two different scenarios. In the first scenario, we assume that the cavity length is fixed by rigid rods. In particular in the case of an optical cavity, we assume that the end mirrors of the cavity are attached to the ends of the rod. For the case of a BEC in a trap, we assume that the length of the system that creates the trapping potential is fixed by rod. We will neglect all effects due to the finite width of the rod; we assume it to be effectively 1-dimensional. Since it is a matter system, its length is given by the proper length $$L_p = \int_a^b d\sigma \sqrt{g_{\mu\nu} s^\mu(\sigma) s^\nu(\sigma)}.$$

For the vertical cavity, we set $s^\mu(\sigma)=(0, 1, 0, 0)$, $a=\bar{r}_b$, and $b=\bar{r}_t$, and for the horizontal cavity, we set $s^\mu(\sigma)=(0, 0, 0, 1)$, $a=z_l$ and $b=z_r$. In the second one, we will also consider the effect of the finite stiffness of the rod that holds the cavity, therefore moving towards more realistic implementations of the predictions of this work.

For the horizontal orientation, we start with the coordinates $(x^\circ, z)$, and we write $\bar{r}(z):=(\bar{r}_b^2+z^2)^{1/2}$. We consider distances of at most the length of the trap/cavity $L_p$ which is of the order between centimeters and micrometers. Therefore $L_p/\bar{r}_b$ is approximately of the same order as $r_s/\bar{r}_b$. Expanding the metric (3) in second order in $z/\bar{r}_b$ and $r_s/\bar{r}_b$, and in first order in their product, we find $$g_{h,\mu\nu} = f_{RS}(\bar{r}_b)\mathrm{diag}(-1,\Sigma(\bar{r}_b)), \quad (4)$$

where we defined the red shift function:

$$f_{RS}(\bar{r}) := \left(1 - \frac{r_S}{\bar{r}} + \frac{r_S^2}{2\bar{r}^2}\right). \quad (5)$$

and the spatial scale function:

$$\Sigma(\bar{r}) := \left(1 + \frac{2r_S}{\bar{r}} + \frac{15 r_S^2}{8\bar{r}^2}\right). \quad (6)$$

As explained above, we assume that the cavity is rigid, and that the weak tidal forces due to the curvature of spacetime are not able to affect the rigidity of the cavity. The rigidity of the BEC trap is well approximated by a constant proper length of the cavity. We obtain $L_p \approx \int_0^{z_r} dz\, f_{RS}(\bar{r}_b)^{1/2} \Sigma(\bar{r})^{1/2} = f_{RS}(\bar{r}_b)^{1/2}$. This equation fixes $z_r$ as a function of $L_p$. We obtain $$z_r \approx f_{RS}(\bar{r}_b)^{-1/2} \Sigma(\bar{r})^{-1/2} L_p. \quad (7)$$

For the vertical scenario, we start with the coordinates $(x^o, x')$, where $x'=x-\bar{r}_b$, and we assume that $x'/\bar{r}_b \ll 1$ and $x'/\bar{r}_b \sim r_s/$ $\bar{r}_b$. Then, we expand the effective 1+1-dimensional metric up to second order in $r_s/\bar{r}_b$ and $x'/\bar{r}_b$ and first order in their product. We obtain $$g_{h,\mu\nu} = f_{RS}(\bar{r}_b)\left(1 + \frac{r_S x'}{\bar{r}_b^2}\right) \times \quad (8)$$

$$\mathrm{diag}\left(-1, \sum(\bar{r}_b)\left(1 - \frac{2 r_S x'}{\bar{r}_b^2}\right)\right) \quad (9)$$

The proper length in the vertical orientation is $$L_p = \int_0^{x'_t} dx' (g_{v,11}(x))^{1/2} \quad (10)$$

$$= f_{RS}(\bar{r}_b)^{1/2} \sum(\bar{r}_b)^{1/2} x'_t \left(1 - \frac{r_S x'_t}{4 \bar{r}_b^2}\right) \quad (11)$$

which can be inverted as $$x'_t = f_{RS}(\bar{r}_b)^{-1/2} \sum(\bar{r}_b)^{-1/2} L_p \left(1 + \frac{r_S L_p}{4 \bar{r}_b^2}\right). \quad (12)$$

In the next Section, we will introduce the description of a BEC in the spacetime described by the metric (3) and we will give the conditions under which the phonon field in the BEC can be described completely analogously to the light field confined in an optical cavity placed in the same spacetime.

Section III. 1-Dimensional Relativistic BEC in the Gravitational Field of the Earth A BEC can be effectively described by the Gross-Pitaevskii equation (see L. P. Pitaevskii, Soviet Physics JETP-USSR 13, 451 (1961) and E. P. Gross, Il Nuovo Cimento 20, 454 (1961)). This accounts for the collective behaviour of the bulk of the atoms that compose the BEC. However, small perturbations of the BEC, known as phonons, appear as quantised massless particles that propagate on an effective curved background metric. The kinematics of the phonons propagating through the bulk are described by a Klein-Gordon equation (21, below), where the metric g is replaced by the effective metric g with components $$\mathfrak{g}_{\mu\nu} = \frac{c}{c_s} \rho \left[ g_{\mu\nu} + \left(1 - \frac{c_s^2}{c^2}\right) \frac{u_\mu u_\nu}{|u_\alpha u^\alpha|} \right]. \quad (13)$$

Here, the speed $c_s$ is defined by $$c_s^2 := \frac{c^2 c_0^2}{|u_\alpha u^\alpha| + c_0^2}, \quad (14)$$

where $$c_0^2 := \frac{\hbar^2}{2m^2} \lambda \rho \quad (15)$$

and the four-vector $u_\mu$, is the flow associated with the phase of the wave function of the BEC bulk (see C. Barceló, S. Liberati, and M. Visser, Classical and Quantum Gravity 18, 1137 (2001)), the speed of sound in the BEC is $c_0$ and the density $\rho$ of the BEC may depend on space and time coordinates. For the BECs that we are considering here, $c_0^2/c^2$ is of the order of $10^{-20}$. Therefore, we can approximate $c_s = c_0$.

An important feature of BECs is that the background metric g can be experimentally tuned to replicate dynamical spacetimes. This can be done experimentally by tuning accordingly the density ρ, the flows $u_\mu$, and the speed of sound $c_0$. This versatile nature of BECs provides us with a tool for probing dynamics and properties of the "real" background spacetime when first attempting to study non-Minkowski background metrics.

The density, the flow and the speed of sound in the BEC cannot be chosen freely and are constrained. By considering two body collisions only, one can model a BEC in a curved spacetime by considering a charged, self interacting scalar field governed by the relativistic, non-linear field Eq. (see the generalisation of Eq. (10) in S. Fagnocchi, S. Finazzi, S. Liberati, M. Kormos, and A. Trombettoni, New J. Phys. 12, 095012 (2010) to curved spacetimes)

$$\Box \hat{\phi} - \left(\frac{m^2 c^2}{\hbar^2} + V\right)\hat{\phi} - \lambda |\hat{\phi}|^2 \hat{\phi} = 0 \tag{16}$$

Here, the function V is the external trapping potential and $\lambda$ is the coupling constant for the self interaction of the BEC atoms. The mean field approximation allows us to replace the field operator by a function, $\hat{\phi} \to \phi$, and we obtain the equation for the mean field $\phi$ of the condensate. This is the relativistic version of the Gross-Pitaevskii equation. By considering a Madelung representation of the mean field, $\phi = \sqrt{\rho} e^{i\theta}$, and by defining $$u_\mu = \frac{\hbar}{m} \partial_\mu \theta,$$

we obtain the hydrodynamical representation of equation 16, which reads $$0 = \partial_\mu \left(\sqrt{-\det(g)}\, g^{\mu\nu} \rho u_\nu\right) \tag{17}$$

$$\|u\|^2 = -g^{\mu\nu} u_\mu u_\nu = c^2 + \frac{\hbar^2}{m^2}\left[V + \lambda\rho - \frac{\Box\sqrt{\rho}}{\sqrt{\rho}}\right].$$

These equations connect the density ρ and the flows $u_\mu$.

As a first approach to the problem of analysing a trapped BEC placed in Schwarzschild spacetime, we assume that the external potential V allows for a constant density ρ and vanishing spatial components of $u_\mu$. As explained in Section II, we consider an effective 1+1-dimensional situation. To this end, we assume that the extension of the bulk is much larger in one direction than in the other two directions. The solution to Eqs. (17) in the elongated direction, when the cavity is horizontal and the trapping potential is uniform with infinite walls, i.e. V=0 inside the box and V=∞ outside of the box, becomes $$u_0^2 = f_{RS}(\bar{r}_b)(c^2 + 2c_0^2) \approx c^2 f_{RS}(\bar{r}_b). \tag{18}$$

When considering the vertical orientation of the effective 1+1-dimensional BEC, the same expression for the flow component $u_0$ as in (18) can be obtained if a potential of the form $V = V_0 + \Delta V$ is added, where $V_0$ is the uniform trapping potential and $\Delta V$ the linear potential given as $$\Delta V = -\frac{m^2}{\hbar^2} \frac{r_S x'}{\bar{r}_b^2} u_0^2 \approx \frac{m^2 c^2}{\hbar^2} \frac{r_S x'}{\bar{r}_b^2}. \tag{19}$$

The potential $\Delta V$ cancels the effect of the gravitational field on the bulk up to second order in $r_s/\bar{r}_b$ and $x/\bar{r}_b$, and first order in their product. The cancellation of the gravitational field is common in experiments with BECs. It is done, for example, by applying a magnetic field of the right strength (see for instance A. L. Gaunt, T. F. Schmidutz, I. Gotlibovych, R. P. Smith, and Z. Hadzibabic, Phys. Rev. Lett. 110, 200406 (2013)). In order to obtain the potential $\Delta V$, the experimenter has to tune the gradient of the linear potential, $d\Delta V/dx$, such that the density is homogeneous. However, $d\Delta V/dx$ can also be fixed to a value that differs slightly from the value necessary to cancel the full effect of the gravitational field. This difference can lead to a density perturbation which has an effect on the phonon field that can, in principle, be measured. Let us assume that $\Delta V_0$ is given by Eq. (19) but $r_s/\bar{r}_b^2$ replaced by some default value adjustments $r_{s,0}/\bar{r}_{b,0}^2$. Then, the corresponding relative density perturbation $\delta_\rho$ defined as $\rho = \rho_o(1 + \delta_\rho)$ is given by $$\delta_\rho = -\frac{1}{2}\frac{c^2}{c_{s0}^2}\left(\frac{r_S}{\bar{r}_b^2} - \frac{r_{S,0}}{\bar{r}_{b,0}^2}\right)\left(x' - \frac{x_t'}{2}\right), \tag{20}$$

obtained via equations (17) by assuming irrotationality of the flows $u_\mu$, and using $\int_0^{x_t'} dx' \delta_\rho = 0$, since the number of atoms is conserved and the unperturbed density $\rho_o$ and speed of sound $c_{s0}$ are constant. The relative perturbation of the density in Eq. (20) can then be used for the measurement of the gravitational field as we will show in the next section.

Section IV. Quantization of the Fields

In this section, we quantise the phonon/light field $\psi$ in the BEC/cavity. The phonon/photon field obeys the massless Klein-Gordon equation (see N. D. Birrell and P. C. W. Davies, Quantum fields in curved space (Cambridge: University Press, 1982)

$$\Box \psi = \frac{1}{\sqrt{-g}} \partial_\mu \left(\sqrt{-g}\, g^{\mu\nu} \partial_\nu\right), \tag{21}$$

where $g := \det(g_{\mu\nu})$. Here, $g_{\mu\nu} = \bar{g}_{\mu\nu}$ for the light field and $g_{\mu\nu} = g_{\mu\nu}$ for the phonon field. For both cases, the 1+1-dimensional metric $g_{\mu\nu}$, depends on the orientation.

A. Horizontal Orientation

First, we consider the photon case. Note that the metric (4) does not depend on the variable z. Therefore, after the transformation to the coordinates $(x^0, \tilde{z})$ with $\tilde{z} = \Sigma(\bar{r}_b)^{-1/2}$, we obtain the metric $$\bar{g}_{h,\mu\nu} = f_{RS}(\bar{r}_b) \mathrm{diag}(-1,1). \tag{22}$$

We impose Dirichlet boundary conditions $\psi_h(x^0, 0) = \psi_h(x^U, \tilde{z}_r) = 0$ on the field $\psi$. The corresponding solutions to Eq. (21) with background metric (22) are the plane waves $$\phi_{h,k}(x^0, \tilde{z}) := \frac{e^{-i\omega_{h,k} t}}{\sqrt{\pi k}} \sin\left(\frac{w_{h,k}}{v}\tilde{z}\right), \tag{23}$$

where k is a positive integer and $$\omega_{h,k}^{cav} = \frac{c\pi k}{\bar{z}_r} = \frac{c\pi k}{L_p} f_{RS}(\bar{r}_b)^{1/2}.$$

The solutions (23) are normalised with respect to the Klein-Gordon inner product $(\phi_h, \phi_h)KG$, h:=$i\int_0^{z_r} d\tilde{z} f(r_b)^{-1/2} (\phi^*_h \partial_0 \phi_h - \phi_h \partial_0 \phi^*_h)$. We can quantise the field $\psi$ in the $\phi_{h,k}$ basis, when studying this horizontal setup, and we find $$\psi_h(x^0, \tilde{z}) = \sum_k \{\hat{a}_{h,k} \phi_{h,k}(x^0, \tilde{z}) + \hat{a}^\dagger_{h,k} \phi^*_{h,k}(x^0, \tilde{z})\}, \quad (24)$$

where the creation and annihilation operators $\hat{a}_{h,k}$, $\hat{a}_{h,k}^\dagger$ satisfy the canonical commutation relation algebra $[\hat{a}_{h,k}, \hat{a}_{h,k}^\dagger,]=\delta_{k,k'}$.

For the phonon field in the BEC, we have to consider the acoustic metric g from Eq. (13). Since the BEC is effectively 1-dimensional, we find, in the coordinates $(c_s t, z)$, $$g_{h,\mu\nu} = \rho \frac{c}{c_s} f_{RS}(\bar{r}_b)(-1, \sum(\bar{r}_b)). \quad (25)$$

This metric is conformally equivalent to the metric for the light field in (4). Therefore, we can recover all the above equations for the light field with the only difference that we obtain the frequencies $$\omega_{h,k} = \frac{c_a \pi k}{L_p} f_{RS}(\bar{r}_b)^{1/2}.$$

Therefore, we can give the general expression for the frequencies $$\omega_{h,k} = \frac{v \pi k}{L_p} f_{RS}(\bar{r}_b)^{\frac{1}{2}}, \quad (26)$$

where $v=c$ for the light field and $v=c_s$ for the phonon field.

B. Vertical Orientation

Again, we first consider the photon case. After the coordinate transformation to $(x^0, \tilde{x})$, where $$\tilde{x} = \sum(\bar{r}_b)^{1/2} \int_0^{x'} dx'' \left(1 - \frac{2r_s x''}{\bar{r}_b^2}\right)^{1/2} \quad (27)$$

$$\approx \sum(\bar{r}_b)^{1/2} x'\left(1 - \frac{r_s x'}{2\bar{r}_b^2}\right),$$

which leads to $x'=\Sigma(\bar{r}_b)^{-1/2} \tilde{x}(1+r_s x'/2\bar{r}_b^2)$, we find the metric $$\tilde{g}_{v,\mu\nu} = f_{RS}(\bar{r}_b)\left(1 + \frac{r_s \tilde{x}}{\bar{r}_b^2}\right) \text{diag}(-1, 1) \quad (28)$$

In second order in $r_s/\bar{r}_b$, and $x'/\bar{r}_b$, and in first order in their product.

The Dirichlet boundary conditions on the field $\psi_v$ imply $\psi_v(x^0, \tilde{x}_b)=\psi_v(x^0, \tilde{x}_t)=0$. We quantise the filed and obtain $$\hat{\psi}_v(x^0, \tilde{x}) = \sum_k \{\hat{a}_{v,k} \phi_{v,k}(x^0, \tilde{x}) + \hat{a}^\dagger_{v,k} \phi^*_{v,k}(x^0, \tilde{x})\}. \quad (29)$$

The creation and annihilation operators $\hat{a}_{v,k}$, $\hat{a}_{v,k}^\dagger$ satisfy the canonical commutation relations $[\hat{a}_{v,k}, \hat{a}_{v,k}^\dagger,]=\delta_{k,k'}$. Here, we have introduced the modes $$\phi_{v,k}(x^0, \tilde{x}) := \frac{e^{-i\omega_{v,k} t}}{\sqrt{\pi k}} \sin\left(\frac{\omega_{v,k}}{c} \tilde{x}\right), \quad (30)$$

where $$\omega_{v,k}^{cav} = \frac{c\pi k}{\tilde{x}_t}$$

are the frequencies with given by Eq. (12) and Eq. (27) as $$\tilde{x}_t \approx f_{RS}(\bar{r}_b)^{-\frac{1}{2}} L_p\left(1 - \frac{r_s L_p}{4\bar{r}_b^2}\right). \quad 31$$

The phonon field can be treated similarly to the horizontal case if the external linear potential is exactly canceling the effect of the gravitational field, i.e. if $\delta_\rho=0$. However, to fix the potential, a precise measurement of the gravitational field would be necessary in the first place which would reduce the utility of our setup for measurement significantly. Instead, the external potential can be fixed to some value close to the cancellation and the effect of the difference can be used for the measurement of the gravitational field itself. As explained in Section III, there are no spatial velocity flows, and we find for the acoustic metric due to a time-independent density perturbation $$g_{v,\mu\nu} \approx \rho_0 \frac{c}{c_{s0}} (1 + \delta_\rho)^{1/2} \begin{pmatrix} c_{s0}^2(1 + \delta_\rho g_{v,00}) & 0 \\ 0 & g_{v,11} \end{pmatrix}, \quad (32)$$

where the unperturbed density and speed of sound are assumed to the be equivalent to the values of these parameters in the vertical orientation. After a re-definition of the time coordinate as $x^0=c_{s0}t$ we arrive at the acoustic metric $$\bar{g}_{v,\mu\nu} = \rho_0 \frac{c}{c_{s0}} (1 + \delta_\rho)^{\frac{1}{2}} \begin{pmatrix} (1 + \delta_\rho)g_{v,00} & 0 \\ 0 & g_{v,11} \end{pmatrix} \quad (33)$$

As in Section II, we start with the coordinates $(x^0, x')$ where $x'=x-\bar{r}_b$, and we assume that $x'/\bar{r}_b<<1$ and $x'/\bar{r}_b \sim r_s/\bar{r}_b$. Then, we expand the effective 1+1-dimensional metric up to second order in $r_s/\bar{r}_b$ and $x'/\bar{r}_b$ and first order in their product. Furthermore, we will consider linear and quadratic terms in the relative density perturbations, which we will justify later. We obtain for the non-zero components of the metric $$\bar{g}_{v,00} = -P(x') \quad (34)$$

$$\bar{g}_{v,11} = P(x')(1 - \delta_\rho + \delta_\rho^2)\Sigma(\bar{r}_b)\left(1 - \frac{2r_s x'}{\bar{r}_b^2}\right) \quad (35)$$

-continued where $$P(x') = \rho_0 \frac{c}{c_{s0}}\left(1 + \frac{3\delta_\rho}{2} + \frac{3\delta_\rho^2}{8}\right) f_{RS}(\bar{r}_b)\left(1 + \frac{r_S x'}{\bar{r}_b^2}\right). \quad (36)$$

Now, we perform a transformation to $(x^0, \tilde{x})$, where $$\tilde{x} := \int_0^{x'} dx'' \sqrt{\frac{\tilde{g}_{v,11}(x'')}{|\tilde{g}_{v,00}(x'')|}}. \quad (37)$$

In these coordinates, the acoustic metric becomes $$\tilde{g}_{v,\mu\nu} = \tilde{P}(\tilde{x})\text{diag}(-1,1), \quad (38)$$

where $\tilde{P}(\tilde{x}) = P(x'(\tilde{x}))$. The normalised solutions to the Klein-Gordon equation (21) are given are given as $$\phi_{v,k}(x^0, \tilde{x}) = \frac{e^{-i\omega_{v,k}t}}{\sqrt{\pi k}} \sin\left(\frac{\omega_{v,k}}{c_{s0}}\tilde{x}\right), \quad (39)$$

and the corresponding frequencies are $$\omega_{v,k}^{BEC} = \frac{c_{s0}\pi k}{\tilde{x}_t}$$

with $\tilde{x}_t$ the coordinate of the end of the trap potential. Since the number of atoms is conserved and the unperturbed density is constant, we find $\tilde{x}_t$ from Eq. (37) as $$\tilde{x}_t = \Sigma(\bar{r}_b)^{\frac{1}{2}} \int_0^{x'_t} dx'\left(1 - \frac{\delta_\rho}{2} + \frac{3\delta_\rho^2}{8}\right)\left(1 - \frac{r_S x'}{\bar{r}_b^2}\right) = \quad (40)$$

$$\Sigma(\bar{r}_b)^{\frac{1}{2}} \int_0^{x'_t} dx'\left(1 - \frac{r_S x'}{\bar{r}_b^2} + \frac{r_S x'}{\bar{r}_b^2}\frac{\delta_\rho}{2} + \left(1 - \frac{r_S x'}{\bar{r}_b^2}\right)\frac{3\delta_\rho^2}{8}\right)$$

This justifies considering quadratic terms in $\delta_\rho$ although we only derived it in first order in $r_S L_p/\bar{r}_b^2$; the only remaining linear term in $\delta_\rho$ is multiplied by $r_S L_p/\bar{r}_b^2$ and, hence, the term in $\delta_\rho$ proportional to $r_S L_p/\bar{r}_b^2$ is the leading order term. Furthermore, as $c^2/c_{s0}^2$ will be of the order of $10^{20}$, we see from Eq. (20) that $\delta_\rho$ can be significantly larger than $r_S L_p/\bar{r}_b^2$.

For the gravitational field of the Earth close to its surface $r_S/\bar{r}_b^2$ is of the order of $10^{-16}$ m$^{-1}$. Therefore, we will neglect the term proportional to the product of and $r_S/\bar{r}_b^2$ and $\delta_\rho^2$ in Eq. (40) in the following. From Eq. (20), we see that $\delta_\rho = \delta'_\rho(x' - x'_t/2)$, where $\delta'_\rho = d\delta_\rho/dx'$. We find $$\tilde{x}_t \approx \sum (\bar{r}_b)^{1/2} \int_0^{x'_t} dx'\left(1 - \frac{r_S x'}{\bar{r}_b^2} + \frac{r_S}{\bar{r}_b^2}\frac{\delta'_\rho}{2}\left(x'^2 - \frac{x' x'_t}{2}\right) + \frac{3\delta'^2_\rho}{8}\left(x'^2 - x' x'_t + \frac{x'^2_t}{4}\right)\right) \quad (41)$$

$$= \sum (\bar{r}_b)^{1/2} x'_t\left(1 - \frac{r_S x'_t}{2\bar{r}_b^2} + \frac{r_S}{\bar{r}_b^2}\frac{\delta'_\rho}{24} x'^2_t + \frac{\delta'^2_\rho}{64} x'^2_t\right)$$

With Eq. (12), we find $$\tilde{x}_t \approx f_{RS}(\bar{r}_b)^{-1/2} L_p\left(1 - \frac{r_S L_p}{4\bar{r}_b^2} + \left(\frac{r_S}{\bar{r}_b^2}\frac{\delta'_\rho}{24} + \frac{\delta'^2_\rho}{64}\right) L_p^2\right). \quad (42)$$

As stated above, for the BECs that we consider herein, $c^2/c_{s0}^2 \sim 10^{20}$. Therefore, from Eq. (20), we find that $r_S/\bar{r}_b^2$ is smaller than $\delta'_\rho$ by more than a factor $10^{14}$ even if the external potential would cancel the effect of the gravitational field with a relative error of the order of $10^{-6}$. Therefore, we can write $$\tilde{x}_t \approx f_{RS}(\bar{r}_b)^{-\frac{1}{2}} L_p\left(1 - \frac{r_S L_p}{4\bar{r}_b^2} + \frac{\delta'^2_\rho L_p^2}{64}\right)$$

For the case that $\delta V \sim 10^{-6}$, $c^2/c_{s0}^2 \sim 10^{20}$ and $L_p \sim 10^{-4}$ m, we obtain that $\delta'^2_\rho L_p^2/64 \sim 10^{-6}$ while $r_S L_p/4\bar{r}_b^2 \sim 10^{-21}$. Therefore, the effect of the density perturbation is dominant and it was justified to consider quadratic terms in $\delta_\rho$ although they are second order in $r_S L_p/\bar{r}_b^2$. The reason for this is the extremely low rigidity of BECs which makes them very sensitive to external forces.

C. Frequency Shifts

Using the relation between the Schwarzschild coordinate r and $\bar{r}$ given as $r = (1 + r_S/4\bar{r})^2 \bar{r}$, we can rewrite the red shift function in the more common form $$f_{RS}(\bar{r}) = 1 - \frac{r_S}{r} = f(r)$$

in second order in $$\frac{r_S}{r}$$

and the frequencies become $$\omega_{h,k}^{cav} = \frac{c\pi k}{L_p} f(r_b)^{1/2} \text{ and} \quad (43)$$

$$\omega_{v,k}^{cav} = \omega_{h,k}^{cav}\left(1 + \frac{r_S L_p}{4\bar{r}_b^2}\right) \quad (44)$$

for the light cavity and $$\omega_{h,k}^{BEC} = \frac{c_{s0}\pi k}{L_p} f(r_b)^{1/2} \text{ and} \quad (45)$$

$$\omega_{v,k}^{BEC} = \omega_{h,k}^{BEC}\left(1 + \frac{r_S L_p}{4\bar{r}_b^2} - \frac{\delta'^2_\rho L_p^2}{64}\right) \quad (46)$$

for the BEC and where $c_s = c_{s0}$ for the horizontal cavity. The factor $f(r_b)^{1/2}$ represents the usual gravitational red shift that is experienced when photons are sent between two points at different height in the gravitational field of the earth (see R. V. Pound and G. A. Rebka, Phys. Rev. Lett. 3, 439 (1959)). Note that, due to the red shift, both frequencies become zero at the Schwarzschild radius, which occurs when approaching a black hole. Hence, this limit has to be taken with care. For our considerations about the gravitational field of the Earth, this is not of importance since every point outside of the surface of the Earth is far from its Schwarzschild radius.

In the limit $L_p \to 0$, we have $\omega_{v,k} \to \omega_{h,k}$. Therefore on the one hand, we conclude that the root of the frequency is the finite spatial extension of the BEC/cavity. In particular, the frequencies $\omega_{v,k}$ for a BEC/cavity with its lower end at $r_b$ are equivalent to the frequencies of the field modes in the horizontal BEC/cavity at $r_e = r_b + L_p/2$ in second order in $L_p/r_b$ and in first order in their product. Hence, there would be no difference between the two systems in this order if the horizontal cavity would be located in the middle between the ends of the vertical cavity. On the other hand, the frequency difference between $\omega_{v,k}$ and $\omega_{h,k}$ for both cavity and BEC, is due to the proper acceleration of the whole system that is necessary to keep it at a fixed Schwarzschild coordinate r. In particular, $\omega_{v,k} = \omega_{h,k}$ only at $r_b = \infty$ that is, asymptotically far from the earth.

For the derivation Eq. (44), we assumed that the proper length of the BEC/cavity is kept fixed by taking a perfectly rigid rod as reference. However, all realistic materials are deformable. In the next section, we will derive the effect of the deformation of the reference rod on the frequency spectrum of the fields in the gravitational field of the earth.

Section V. Deformation of the Cavity

We assume that the cavity/trap is supported by a rod of constant but negligible width. Furthermore, we assume that the material properties are constant along the rod. To keep the cavity/trap at a constant distance from the centre of the Earth, the whole system has to be accelerated upwards. We assume that this is achieved by supporting the rod from below at $r_b$ (not by suspending it from above).

Therefore, the upward acceleration will contract the rod if it is vertically oriented and there will be no effect on the rod if it is horizontally oriented. In the following, we will derive the effect in for the vertical orientation. Again, we use the metric (28) in the coordinates $(x^0, \tilde{x})$, and we do all calculations up to the second order in second order in $r_s/r_b$, and $\tilde{x}/r_b$, and in first order in their product. In the first step, we derive the acceleration of a segment of the rod in the gravitational field from the geodesic equation $$\frac{d^2}{d\tau^2}\xi^\mu(\tau) = -\Gamma^\mu_{\alpha\beta}(\xi(\tau))\dot{\xi}^\alpha(\tau)\dot{\xi}^\beta(\tau), \tag{47}$$

where the dot denotes the derivative with respect to the proper time T of the segment and the connection coefficients are given as $$\Gamma^\mu_{\nu\rho} = \frac{1}{2}\tilde{g}^{\mu\sigma}_v\left(\partial_\nu \tilde{g}_{v,\sigma\rho} + \partial_\rho \tilde{g}_{v,\sigma\nu} - \partial_\sigma \tilde{g}_{v,\nu\rho}\right). \tag{48}$$

We assume that, initially, $\dot{\xi}^\beta(\tau) = ((\tilde{g}_{v,00})^{-1/2}, 0)$ and we find that $$a^{\tilde{x}} = \frac{d^2\xi^x}{dt^2} =, (\xi^0)^{-2}\frac{d^2\xi^x}{d\tau^2} = -\frac{c^2 r_S}{2\bar{r}_b^2} \tag{49}$$

Every segment of the rod at $\tilde{x} \in [0, \tilde{x}_t]$ will be affected by an inertial stress that is given by the all of the segments above it. For the proper length of every segment $d\tilde{x}$ of the rod we have $(\tilde{g}_{v,11})^{1/2} d\tilde{x}$ and therefore, its density is given as $(\tilde{g}_{v,11})^{1/2} \rho d\tilde{x}$. Then, we find the stress as $$\sigma_{\tilde{x}}(\tilde{x}) = a^{\tilde{x}} \int_{\tilde{x}}^{\tilde{x}_t} d\tilde{x}(\tilde{g}_{v,11})^{\frac{1}{2}}\rho = f_{RS}^{\frac{1}{2}}(\bar{r}_b)\rho a^{\tilde{x}}(\tilde{x}_t - \tilde{x}). \tag{50}$$

With Hooke's law we find the strain $\epsilon_{\tilde{x}}(\tilde{x}) = \sigma_{\tilde{x}}(\tilde{x})/E$, we find for the change of the proper length of the rod using Eq. (31) and $r = (1 + r_s/4\bar{r})^2 \bar{r}$ $$\Delta L_p = \int_0^{\tilde{x}_t} d\tilde{x}(\tilde{g}_{v,11})^{\frac{1}{2}}\epsilon_{\tilde{x}}(\tilde{x}) \tag{51}$$

$$= f_{RS}(\bar{r}_b)\frac{\rho a^{\tilde{x}} \tilde{x}_t^2}{2E} \tag{52}$$

$$\approx -\frac{c^2 \rho}{E}\frac{r_S L_p^2}{4\bar{r}_b^2} \approx -\frac{c^2 \rho}{E}\frac{r_S L_p^2}{4r_b^2} \tag{53}$$

The ratio $E/\rho_{rod}$ is called the specific modulus or stiffness to density ratio. It is equivalent to the square of the speed of sound $c_{rod}$ in the longitudinal direction of the rod. Therefore, we obtain $$\Delta L_p = -\frac{c^2}{c_{rod}^2}\frac{r_S L_p^2}{4r_b^2}. \tag{54}$$

Figure 3:
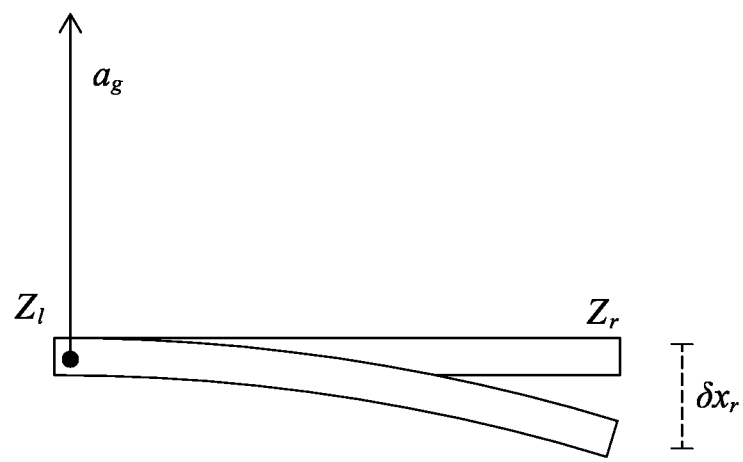
FIG. 3 schematically illustrates effects of acceleration on a rod used to suspend the device creating the trapping potential for the BEC.

Another meaningful question arising is, will tidal effects on the horizontal rod take part in the sensitivity? Due to the sphericity of the planet, the horizontal rod will be an effective cantilevered rigid beam supported on $z_l = 0$ and subjected to gravitational acceleration on every other point of the system, as depicted in FIG. 3. The classical displacement ox at each point $z \in [0, z_r]$ of the cavity is effectively given by equation (2.3) of V. Srivastava, H. Jones, and G. Greenwood, Proceedings of the Royal Society of London A: Mathematical, Physical and Engineering Sciences 462, 2863 (2006). By considering a constant gravitational force (up to second order in $z_r/r_b$, $z/r_b$, and first order in their product), the displacement is $$\delta x = 3\frac{c^2}{c_{rod}^2}\frac{r_S}{r_b^2}\frac{1}{h^2}\left(\frac{z_r^2 z^2}{2} - \frac{z_r z^3}{3} + \frac{z^4}{12}\right), \tag{55}$$

where h is the thickness of the rod. Given that $L_p \sim z_r$, we can estimate the frequency change due to this deformation by defining an upper bound $L_p^{tidal}$ of the deformed rod as $$dL_p^{tidal}\sqrt{dz^2 + d(\delta x)^2} \approx \left(1 + \left(\frac{d(\delta x)}{dz}\right)^2\right)dz. \tag{56}$$

Although this is clearly not the length that the rod will have in reality, it will serve with as a heuristic argument for our purposes.

Integrating equation (56) and defining $\omega_{h,k}^{tidal} := v\pi k/L_p^{tidal}$, we find $$\omega_{h,k}^{tidal} \approx \omega_{h,k}\left(1 - \frac{9}{28}\frac{c^4}{c_{rod}^4}\frac{r_S^2}{r_b^4}\frac{L_p^6}{h^4}\right). \tag{57}$$

To compete with the smallest correction $3L_p r_s/2r_b^2$, the rod would have to be as thin as $h \sim 10^{-4}$ m which would imply h~$L_p$ since $L_p$~$10^{-4}$. In order to be comparable with the effect given by the deformation of the vertical cavity $3L_p c^2 r_s/2c_{rod}^2 r_b^2$, one would need h~$10^{-6}$ m. Finally, to be comparable with the effect induced by the deformation of the BEC $\delta'^2_\rho L_p^2/64$ the thickness would need to be h~$10^{-7}$ m.

For our purposes we will assume that the rod is sufficiently thick for this effect to be negligible. In the case of a light cavity, the change of proper length $L_p$ only affects the radar length, and we can write the resonant frequencies as $$\omega_{v,k}^{cav} = \omega_{h,k}^{cav}(1 + \Lambda). \tag{58}$$

Where $$\Lambda := \frac{1}{4}\frac{r_S}{r_b^2}\left(\frac{c^2}{c_{rod}^2} + 1\right)L_p. \tag{59}$$

For an aluminium rod, $c^2/c_{rod}^2$ is of the order $10^8$ and for a rod of carbyne (linear acetylenic carbon), the material with the highest known specific modulus, it would be of the order $10^8$. Therefore, in all realistic situations, $c^2/c_{rod}^2+1$ is equivalent to $c^2/c_{rod}^2$ in equation (59).

In the case of a uniformly trapped BEC, the length change also affects the speed of sound c, since it is proportional to the square root of the density of the BEC which is proportional to the square root of the inverse of the proper length of the trap. We obtain that $$\omega_{v,k}^{BEC} = \omega_{h,k}\left(1 + \frac{3}{2}\Lambda\right). \tag{60}$$

We write the general equation $$\omega_{h,k}^{def} = \frac{v\pi k}{L_p}f(r_b)^{1/2} \text{ and} \tag{61}$$

$$\omega_{v,k}^{def} = \omega_{h,k}(1 + \Theta). \tag{62}$$

where v and $\Theta$ are defined for the light cavity and the BEC respectively as $$\text{Light}\begin{cases} v = c \\ \Theta = \Lambda \end{cases}, \tag{63}$$

$$\text{BEC}\begin{cases} v = c_{s0} \\ \Theta = \frac{3}{2}\Lambda - \frac{\delta'^2_\rho L_p^2}{64} \end{cases}.$$

The time evolution of a single mode of the field gives rise to a phase which can be employed to measure time. In this sense, these modes correspond to extended quantum clocks. We have already noted that $\omega_{h,k} \to \omega_{v,k}$ for $r_b = \infty$. Therefore, the extended clocks work like local clocks for the observer at an infinite radial distance. This occurs because, at an extremely large (infinite) distance from the surface of the Earth no proper acceleration is needed to keep the system at a fixed coordinate r. We will discuss further properties of our extended clocks in Section A (below). With two clocks at different height, the red shift and the Schwarzschild radius of the earth can be inferred. This will be part of Section A as well. However, also the frequency difference of modes of two differently oriented BECs/cavities due to proper acceleration can employed for a measurement of that acceleration. When the radius to the center of the earth is known, the Schwarzschild radius of the earth can be inferred. We will discuss this application in Sections VI and VII.

A. Measurements of Proper Time

Special relativity predicts that time is not an absolute concept. However, a meaningful notion of time can be constructed as the time measured by a point-like clock moving along the world-line of a physical (pointlike) observer. This time is known as proper time $\tau$ and is defined as $\tau = -\int ds$, where ds is the line element. In the gravitational field of the Earth, we have $\tau_r = f(r)^{1/2}t$ for an observer at a fixed radial position r. In the following, we want to calculate the principle error bound on the estimation of the proper time $\tau_{rb}$ by a measurement on a single mode of the quantum field in the extended clock built from an optical cavity or the phonon field in a BEC. To this end, we employ quantum metrology and the quantum Cramer-Rao bound which gives a lower bound for the absolute error of the estimation of a parameter $\lambda$ from a measurement on a quantum system $\Delta\lambda^2$ given a specific initial state. We have for the lower bound $$\Delta\lambda^2 \geq \frac{1}{MF(\lambda, Q)} \geq \frac{1}{MH(\lambda)}, \tag{64}$$

where H is the quantum Fisher information (QFI) and M is the number of repetitions of the experiment (see D. Šafránek and I. Fuentes, Phys. Rev. A94, 062313 (2016) for some details). From the absolute error bound $\Delta\lambda$ we can obtain the relative error bound as $|\Delta\lambda|/|\lambda| \geq \delta(\lambda)$ where $\delta(\lambda) := (|\lambda|/\sqrt{MH(\lambda)})^{-1}$. The quantum Fisher information is obtained by optimisation over all possible measurements for a given initial state of the system. Therefore, to obtain a value for the bound, an initial state has to be specified. Later we will give an example of a measurement that can be used to approach the bound in practice. For a more detailed account of the tools used here and the derivation of the error bounds see Appendix 2.

In order to compute the error bound on the measurement of the proper time $\tau_{rb}$, we have to set $\lambda = \tau_{rb}$. We assume that the initial state is a single-mode squeezed coherent state (SMSC) of a given mode k, defined as $\hat{D}_k(\alpha)\hat{S}_k(r)|0_k\rangle$ where $$\hat{S}_k(r) = \exp\left[\frac{r}{2}\left(\hat{a}_k^{\dagger 2} - \hat{a}_k^2\right)\right]$$

is the squeezing operator, $r \in \mathbb{R}$ (i.e. r is a real number) is the squeezing parameter, $\hat{D}_k(\alpha) = \exp[\alpha\hat{a}_k^\dagger - \alpha^*\hat{a}_k]$ is the displacement operator and $|0_k\rangle$ is the vacuum state of mode k. We assume that all other modes are in the vacuum state. Then, we obtain the relative error bound (see Eq. A7 in Appendix 2)

$$\delta_k^{SMSC}(\tau_{r_b}) = \frac{1}{\sqrt{2M}\left|\sqrt{\sinh^2(2r) + 2|\alpha|^2 e^{2r}}\,\tau_{r_b}\frac{d}{d\tau_{r_b}}\psi_k\right|}, \tag{65}$$

where $\psi_k$ is the time dependent phase change of the field mode. We have $\psi_{h,k} = \omega_{h,k}t = \omega_{0,k}\tau_{r_b}$, for the horizontal orientation of the extended clock and $\psi_{v,k} = \omega_{v,k}t = \omega_{0,k}(1+\Theta)\tau_{r_b}$, for the vertical orientation, where we define $$\omega_{0,k} := \frac{v\pi k}{L_p}, \quad (66)$$

which is the k-th frequency of the field in the cavity when it is placed asymptotically far from the Earth. Employing Eq. (61) and Eq. (62), we obtain the relative error bound for proper time measurement with the SMSC state to first order in $\Lambda$, which reads $$\delta_{h,k}^{SMSC}(\tau_{r_b}) = \frac{1}{\sqrt{2M}\sqrt{\sinh^2(2r) + 2|\alpha|^2 e^{2r}}|\omega_{0,k}\tau_{r_b}|} \quad (67)$$

$$\delta_{v,k}^{SMSC}(\tau_{r_b}) \approx \delta_{h,k}^{SMSC}(\tau_{r_b})(1-\Theta). \quad (68)$$

Given our results (67) and (68), we can answer the following question: How well can the proper time $\tau_{rb}$ be measured using an extended clock (cavity) with its lower end at $r_b$ in the vertical setup and the whole clock at $r_b$ in the horizontal setup?

For the horizontal setup, we find that the relative error bound does not depend on the position of the clock, which coincides with what we would expect from a local clock that is not coupled to an external field. Its precision does not depend on its motion. To first order in $L_p$, the results (67) and (68) coincide and we would get the same result for the vertical orientation. However, we note that there is a small correction proportional to the proper length of the cavity and the gravitational acceleration $a_g = c^2 r_s/(2r_b^2)$ at $r_b$. Interestingly, this correction increases the sensitivity of the proper time measurement since the frequency is increased by a factor $1+\Theta$. Since $\Theta$ is very small in practice (for an aluminum rod of 1 m, at most of the order $10^{-8}$), the increase in sensitivity is negligible. Therefore, we will not distinguish the two orientations in the next section, where we derive the sensitivity for the estimation of red shift by comparing the readings of two clocks at different distances from the surface of the Earth.

B. Estimation of Red Shift

With two extended clocks at two different positions $r_b$ and $r'_b$ we can measure the gravitational time dilation or red shift. To achieve this, the reading of the extended clock at $r'_b$ could be encoded into a light signal that is sent to the clock at $r_b$, where the readings are compared. The red shift is given as $=(\lambda_{r'_b}-\lambda_{r_b})/\lambda_{r_b}$, where $\lambda_{r_b}$ and $\lambda_{r'_b}$ are the wave length of a light signal at $r_b$ and $r'_b$, respectively. Since the wavelengths and the frequency are related as $\lambda_{r_b}=2\pi c/\omega_{r_b}$ and the phase $$\psi = \omega_{r_b}\tau_{r_b}$$

is a scalar, we have $$z = \frac{T_{r'_b} - T_{r_b}}{T_{r_b}} = \frac{T_{r'_b}}{T_{r_b}} - 1. \quad (69)$$

From standard uncertainty propagation, we know that the relative error bound behaves as $$\delta(z) = \sqrt{\left(\frac{\tau_{r'_b}}{z}\frac{\partial z}{\partial \tau_{r'_b}}\right)^2 \delta_{r'_b}(\tau_{r'_b})^2 + \left(\frac{\tau_{r_b}}{z}\frac{\partial z}{\partial \tau_{r_b}}\right)^2 \delta_{r_b}(\tau_{r_b})^2}$$

-continued $$= \frac{f(r_{b'})^{1/2}}{|f(r_{b'})^{1/2} - f(r_b)^{1/2}|}\sqrt{\delta_{r_{b'}}(\tau_{r_{b'}})^2 + \delta_{r_b}(\tau_{r_b})^2}$$

Note that the relative error bound becomes infinite for $r_b=r_b$ as we could have expected since the relative red shift vanishes for $r_b=r_b$. One particular situation is $r_{b'}\to\infty$, which corresponds to a clock at infinite radial distance from the surface of the Earth. In the limit $r_{b'}\to\infty$, we have that $(f(r_b)/f(r_{b'}))^{1/2}\to f(r_b)^{1/2}$, which gives the total gravitational red shift of a light signal emitted at $r_b$ compared with a clock at infinite radial distance. The observer at spatial infinity is particularly interesting since its proper time is the coordinate time and the frequencies of the field inside the cavity measured by this observer are independent of the orientation of the cavity and take the value $\omega_{0,k}=v\pi k/L_p$. We have $$\delta(z_\infty) = \frac{1}{|1 - f(r_b)^{1/2}|}\sqrt{\delta_\infty(\tau_\infty)^2 + \delta_{r_b}(\tau_{r_b})^2}. \quad (70)$$

In the next Section, we discuss the estimation of the Schwarzschild radius of the Earth using the extended clocks.

C. Estimation of the Schwarzschild Radius $r_s$

Since the red shift function $f(r_b)=(1-r_s/r_b)$ contains the Schwarzschild radius of the Earth $r_s$, the measurement of relative time dilation or red shift can be used to infer the Schwarzschild radius. To compute this, we need to assume that either the position $r_{b'}$ of the sender and $r_b$ of the receiver are known, or three clocks are used. We will consider the first case here. Let us assume that the reading of the extended clock at $r_{b'}$ is encoded in a classical light signal and sent down to the receiver at $r_b$. To evaluate a proper time difference $\tau_{r_b}-\tau_{r_{b'}}$, one needs a reference time. Since we are comparing the signals at $r_b$, the reference time is $\tau_{r_b}$. Hence, the observable that we are considering here is again the red shift $$z = \frac{\tau_{r_{b'}}}{\tau_{r_b}} - 1.$$

From standard uncertainty propagation, we know that the relative error bound behaves as $$\delta(r_S) = \quad (71)$$

$$\frac{z}{r_S}\left|\frac{\partial r_S}{\partial z}\right|\delta(z) = \frac{z}{r_S}\left|\frac{\partial z}{\partial r_S}\right|^{-1}\delta(z) = \frac{2r_b}{r_S}f(r_b)\sqrt{\frac{\delta_{r_{b'}}(\tau_{r_{b'}})^2 + \delta_{r_b}(\tau_{r_b})^2}{\left|1 - \frac{r_b}{r_{b'}}\frac{f(r_b)}{f(r_{b'})}\right|}}.$$

Again, the relative error bound becomes infinite for $r_b=r_b$ as we could have expected since the relative time dilation vanishes for $r_b=r_b$. Therefore, we recover the standard general relativity tenet that locally, space-time is flat. Let us consider the particular case of the emitter at an infinite radial distance from the surface of the Earth $r_{b'}\to\infty$. From Eq. (71), we obtain $$\delta_k^{SMSV,\infty}(r_S) = 2\left(\frac{r_b}{r_S} - 1\right)\sqrt{\delta(\tau_\infty)^2 + \delta(\tau_{r_b})^2} \quad (72)$$

In the next Section we will provide numbers for the relative error bounds we derived so far.

D. Measurements with Photons and Phonons Let us see how well we can measure proper time, red shift and the Schwarzschild radius of the Earth using the electromagnetic field in a cavity or the phononic field in BEC. The change between the two systems can be readily obtained by substituting the speed of light c with the speed of sound $c_{s0}$. The physical implementation, however, carries different challenges. This is due to the fact that both the amount of squeezing and the lifetime of the excitations are significantly different for photons and phonons within state-of-the-art experimental set-ups.

From Eq. (65), we see that the precision increases with the frequency $$\omega_{0,k} = \frac{v\pi k}{L_p}$$

of the mode under consideration. Hence, we choose a small cavity length $L_p=200$ μm. For photons, we have $v=c$ and we can assume a maximal squeezing of $r=1.7$ which is about 15 dB—the highest squeezing achieved to date. Using the reflectivity of current state-of-the-art mirrors, the largest time scale for photons is of the order of $\tau_{i,photons}=70$ ns, which corresponds to the time that it takes to decrease the initial photon number $n_i$ to $n_{i/e}$. We can assume a power of 1 mW in the cavity, which corresponds to about $10^4$ photons for a wavelength of 500 nm. For the phonon field, we have $v=c_{s0}$, which can be of the order 0.05 m/s, and we assume the maximal squeezing to be $r=5.3$ and the maximal number of phonons $10^4$. In a BEC, the maximum time scale is the decoherence time of the phonons of about $\tau_{i,photon}=6$ s. With these numbers, we find for the photon field an error bound $\delta_{h,k}^{SMSC}(\tau_{r_b})$ of the order of $10^{-7}/\sqrt{Mk}$ and for phonons $\delta_{h,k}^{SMSC}(\tau_{r_b})\sim 10^{-10}/(\sqrt{Mk})$. Since the same time interval cannot be measured twice, we can set $M=1$. We see that the phononic field performs better than the light field although the frequencies are much higher for the light field. One reason for this to occur is that it is not the frequency but the maximal achievable phase change $\psi_k=\omega_{0,k}\tau$ that governs the relative error bound. The phonon states live longer than the photon states. But this would only lead to equivalence of the error bounds in our case. Another reason is that one can achieve much higher squeezing in a phononic field.

However, even for very high mode numbers, the relative error bounds we obtained cannot match the relative error of about $10^{-17}$, which can be achieved by the best clocks currently available. In the case of the phonon field, another problem arises when considering time measurements. The shortest time measurable with the phononic clock would be 6 s if one aims at relative precision of $10^{-8}$. The shortest time that can be measured in principle with the extended clocks is given by the absolute error bound $\Delta_{n,k}^{SMSC}(\tau_{r_b})=\tau_{r_b}\delta_{h,k}^{SMSC}(\tau_{r_b})$. We find for the photon field a fundamental time resolution of the order of $10^{-10}$ s/($\sqrt{Mk}$) and for the phonon field of the order of $10^{-9}$ s/($\sqrt{Mk}$). Again, we can assume that $M=1$ since a time interval cannot be measured twice and there cannot be more than one experiment at the same position.

For the estimation of the red shift and the Schwarzschild radius, the significant figure of merit is the best relative error bound since we do not need a high time resolution of the measurement (for practical reasons, it may be desirable to stay below $10^3$ s measurement time). For the estimation of the Schwarzschild radius, if $r_b \gg r_s$ we find for quotient of the factor in Eq. (72) and the factor in Eq. (70)

$$2\frac{r_b}{r_s}f(r_b)\left|1 - f(r_b)^{1/2}\right| \approx 1. \tag{73}$$

We can conclude that the values of the relative error bounds for the estimation of the Schwarzschild radius and those for the estimation of the red shift are of the same order of magnitude. Therefore, we will only discuss the estimation of the Schwarzschild radius in the following.

Assuming $r_b=6371$ km and $r_s=8.89$ mm, we find the value $1.43\times 10^9$ for the factor (73) that would appear in Eq. (72), which has to be multiplied with the error bounds for the proper time measurements in order to obtain the relative error bounds $\delta(z_\infty)$ for the estimation of the Schwarzschild radius. In the gravitational field of the Earth we have $r_b \gg r_s$ and we can assume that both clocks reach their maximal accuracy by approximately the same proper time at $r_\infty$. Considering the SMSC state and the mode k, we find a relative error bound $\delta_k^{SMSC,\infty,light}(r_s)$ of the order of $10^3/(\sqrt{Mk})$ for the light field and $\delta_k^{SMSC,\infty,BEC}(r_s)\sim 1/(\sqrt{Mk})$ for the phonon field. In contrast to the measurement of proper time, the estimation of the Schwarzschild radius can be performed several times. Let us assume that the experiment is performed for the lifetime $\tau_i$ of the states, which we assumed to be 70 ns for the light field and 6 s for the phononic field. If we assume that the experiment will be restarted without delay, we can set $M=\tau/\tau_i$. We find for a measurement time of one year, i.e. $\tau=3.17\times 10^7$ s a relative error bound $\delta_k^{SMSC,\infty,light}(r_s)$ of the order of $10^{-6}/k$ for the light fields in a cavity and a relative error bound $\delta_k^{SMSC,\infty,BEC}(r_s)$ of the order of $10^{-4}/k$ for the phonon field in a BEC. This shows that the photonic clock is more precise for the measurement of the Schwarzschild radius than the phononic clock. In general, we find for the quotient of the two error bounds $$\frac{\delta_k^{SMSC,\infty,light}(r_S)}{\delta_k^{SMSC,\infty,BEC}(r_S)} \sim 10^{-2}. \tag{74}$$

In principle, the sensitivity of the measurement could be increased significantly if, instead of just the classical time measurement, the whole quantum state of the clock at $r_{b'}$ could be encoded in a light signal and sent down to $r_b$. Then, the quantum states of the two clocks could be brought into interference and a measurement could be performed afterwards. In order to give the error bound for this situation, we need to take into account the effect of the propagation of the light signal from $r_{b'}$ to $r_b$ and the exact mechanism of interference has to be specified.

However, if we use two differently oriented extended clocks, we are able to let them interfere locally circumventing the transmission of any signal. We will discuss this set up in the next sections.

Section VI. Local Estimation of the Schwarzschild Radius

In this section, we investigate how to estimate the Schwarzschild radius locally by using two differently oriented clocks. First, we consider the comparison of independent readings of the clocks. At the end, we will also consider measurements of the whole system.

The phase of a mode of the field for the vertical and horizontal orientation evolve as $\psi_{v,k}=\omega_{0,k}(1+\Theta)\tau_{r_b}$, and $\psi_{h,k}=\omega_{0,k}\tau_{r_b}$. Hence, the vertically oriented clock with its lower end at $r_b$ is effectively showing a proper time $\tau_{\it eff}=(1+\Theta)\tau_{r_b}$ while the horizontally oriented clock is showing the proper time $\tau_{r_b}$. This difference can be used to estimate the Schwarzschild radius locally if $r_b$ is known with sufficient accuracy. We find $$\delta^{local}(r_S) = \frac{1}{r_S}\left|\frac{\partial}{\partial r_S}\ln\frac{\tau_{\it eff}}{\tau_{r_b}}\right|^{-1}\sqrt{\delta(\tau_{\it eff})^2 + \delta(\tau_{r_b})^2} = \frac{1}{r_S}\left|\frac{\partial\Theta}{\partial r_S}\right|^{-1}\sqrt{\delta(\tau_{\it eff})^2 + \delta(\tau_{r_b})^2} \tag{75}$$

Considering $r_b \gg r_s$ and the SMSC state, it follows that $$\delta_k^{cav,loc}(r_S) \approx \frac{4r_b^2}{r_S L_p}\frac{c_{rod}^2}{c^2}\sqrt{2}\,\delta_k^{SMSC}(\tau_{r_b}) \tag{76}$$

for the light field in the cavity and $$\delta_k^{BEC,loc}(r_S) \approx \frac{4r_b^2}{r_S L_p}\left|\frac{3}{2}\frac{c^2}{c_{rod}^2} - \frac{c^2}{c_{s0}^2}\frac{\delta'_\rho L_p}{8}\right|^{-1}\sqrt{2}\,\delta_k^{SMSC}(\tau_{r_b}) \tag{77}$$

for the phonon field in the BEC. $\delta'_\rho L_p$ is the relative change of the density of the BEC over the length of the trapping potential due to the difference between the external linear potential $\Delta V$ and the linear part of the gravitational field. We find that the sensitivity increases with increasing $\delta'_\rho L_p$. This is because $\delta'_\rho L_p$ appears quadratic in the relative frequency shift $\Theta$. Let us assume that $\delta'_\rho L_p \sim 10^{-2}$. Then, we obtain that $c^2\delta'_\rho L_p/8c_{s0}^2$ is of the order $10^{18}$. As stated above, for an aluminium rod, $c^2/c_{rod}^2$ is of the order $10^9$. Therefore, the effect of the density perturbation in the BEC dominates and we can write $$\delta_k^{BEC,loc}(r_S) \approx \frac{4r_b^2}{r_S L_p}\frac{c_{s0}^2}{c^2}\frac{8}{\delta'_\rho L_p}\sqrt{2}\,\delta_k^{SMSC}(\tau_{r_b}). \tag{78}$$

Let us give some values for the relative error bounds in Eq. (76) and Eq. (78). For the experimental parameters considered in subsection D above, and considering an aluminium rod with density of the order of 7000 kgm$^{-3}$ and Young's modulus of the order of 70 GPa, for the light field we obtain a single-shot relative error bound of the order of $10^4$ and after one year of integration time we get $10^{-5}$. For the phonon field in the BEC, we find a single-shot relative error bound of the order of $10^{-6}$, further increasing to $10^{-10}$ after a year of integration. However, to achieve this sensitivity, the applied external linear potential $\Delta V$ has to be known by the same precision. Note that such an experiment can be performed on a length scale of 200 µm. In contrast to experiments with atom interferometry and drop towers, all parts of the experimental apparatus are at rest.

Employing two extended clocks at the same position can have an additional advantage. They can be brought into interference. This means that one could entangle the modes before the measurement. Furthermore, quantum mechanical measurements could be performed on both systems without the necessity of encoding the state of one of the two clocks into an intermediate quantum system, such as a laser beam, for the transportation of the quantum state. We will discuss this possibility in the next section by giving an explicit measurement that can approach the error bound given by the quantum Fisher information Section VII. A Phononic Mach-Zehnder Interferometer Mach-Zehnder interferometers on BECs have been experimentally proposed in early work such as T. Berrada, S. van Frank, R. Bucker, T. Schumm, J. F. Schaff, and J. Schmiedmayer, Nature Communications 4, 2077 EP (2013). and J. Grond, U. Hohenester, J. Schmiedmayer, and A. Smerzi, Phys. Rev. A 84, 023619 (2011), when the condensate is trapped in a harmonic potential. Although experimental interferometer schemes with box-trapped phonons as the quantum states are yet to be developed, proposals such as A. C. J. Wade, J. F. Sherson, and K. Mølmer, Phys. Rev. Lett. 115, 060401 (2015) that allow the mapping of the quantum state of a BEC into a light field make this idea feasible in the near future.

Let us consider two phononic modes of the same wave number, one in the horizontal orientation with frequency $\omega_{h,k}$ and one in the vertical orientation with frequency $\omega_{v,k}=\omega_{h,k}(1+\Theta)$, as seen in FIG. 1. The difference of the frequencies $\omega_{v,k}-\omega_{h,k}=\omega_{h,k}\Theta$ contains information about the Schwarzschild radius that can be extracted locally—in contrast to the sum of the frequencies. As proven in traditional MZI setups for optimal precision, we will consider the horizontal cavity to be in a coherent state and the vertical cavity in a squeezed vacuum state as depicted in FIG. 1.

Figure 4:
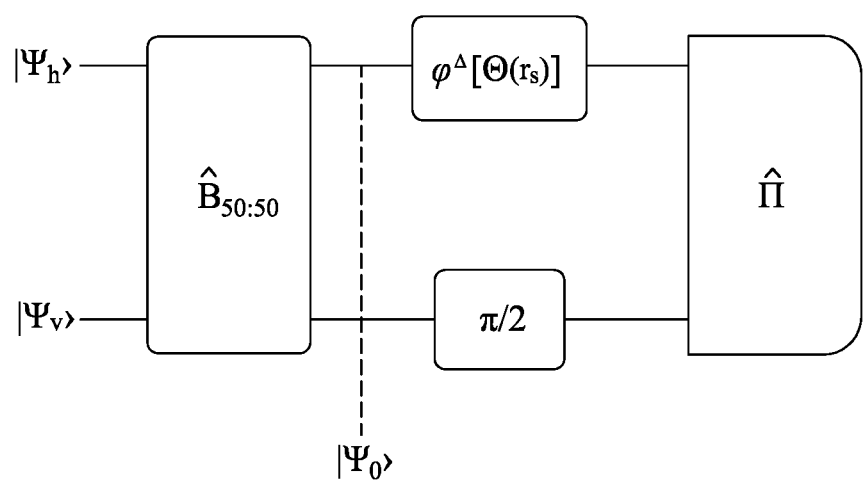
FIG. 4 schematically illustrates the principle of an interferometric measurement set up.
Figure 5:
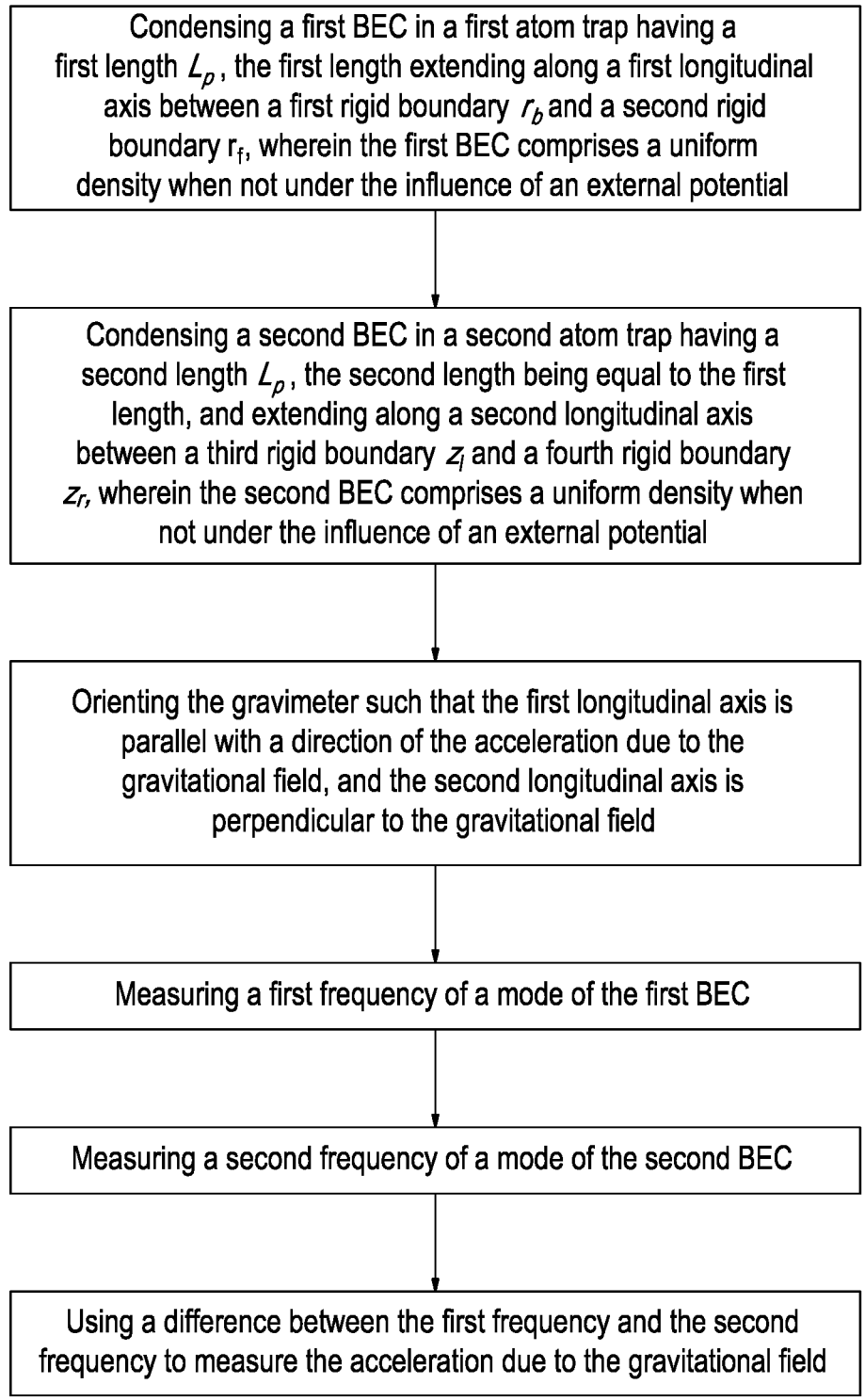
FIG. 5 sets out steps of a method of measuring acceleration.

The full transformation of the state depicted in FIG. 4 is given by $$\hat{B}_{50:50}^\dagger\left(\hat{U}(\phi^\Delta[\Theta(r_S)])\otimes\hat{U}\left(\frac{\pi}{2}\right)\right)|\Psi_0\rangle, \tag{79}$$

representing a MZI scheme with an artificial phase shift of $$\frac{\pi}{2},$$

where $|\Psi_0\rangle:=\hat{B}_{50:50}^\dagger|\Psi_h\rangle$, $\phi^\Delta[\Theta(r_s)]\psi_v-\psi_h=\Theta\psi_{0,k}$, the beam splitting operation is $$\hat{B}_{50:50} = e^{-i\frac{\pi}{2}\hat{J}_y}$$

given in the Schwinger representation by $$\hat{J}_y = \frac{i}{2}\left(\hat{a}_v^\dagger\hat{a}_h - \hat{a}_h^\dagger\hat{a}_v\right)$$

and the phase shift induces the transformations $$\hat{a}_h \to \hat{a}_h e^{i(\phi^\Delta - \frac{\pi}{2})}$$

and $\hat{a}_v \to \hat{a}_v$. Here, the initial state is then expressed as $|\Psi_h\rangle = \hat{D}(\alpha)|0\rangle = |\alpha\rangle$, $|\Psi_v\rangle = \hat{S}(r)|0\rangle = |r\rangle$. After the state evolution, a second 50:50 beam splitter is placed before a measurement M takes place. The after-phase procedure is depicted with $\hat{\pi}:=\hat{B}_{50:50}^\dagger\hat{M}$. In order to achieve sub shot-noise sensitivities, a number of different measurements can be taken, each yielding different sensitivities. One option is to take the difference of phonon counting on each arm, given by the measurement $$\hat{M} = \hat{J}_z = \frac{1}{2}\left(\hat{a}_h^\dagger \hat{a}_h - \hat{a}_v^\dagger \hat{a}_v\right)$$

in the Schwinger representation. Due to error propagation, the relative error of the Schwarzschild radius in terms of this measurement is given by $$\delta_{exp}^{MZI}(r_S) \approx \frac{1}{\psi_{0,k}\sqrt{M}} \frac{4r_b^2}{r_S L_p} \frac{c_{s0}^2}{c^2} \frac{8}{\delta_p L_p} \Delta\phi^\Delta, \quad (80)$$

where $\Delta\phi^\Delta$ is given by $$\Delta\phi^\Delta = \sqrt{\frac{|\alpha|^2 e^{-2r} + \sinh^2(r) + \tan^2(\phi^\Delta) F(\alpha, r)}{(|\alpha|^2 - \sinh^2(r))^2}} \quad (81)$$

with $F(\alpha,r) = |\alpha|^2 - 2\sinh^2(r)\cosh^2(r)$ and $\alpha = i|\alpha|$ (see L. Pezze and A. Smerzi, Phys. Rev. Lett. 100, 073601 (2008)). Due to the artificial phase $\pi/2$, the optimal sensitivity is then shifted to $\phi_{opt}^\Delta = 0$. It must be kept in mind however, that the sensitivity becomes infinite when the number of squeezed and coherent phonons is the same. Nevertheless, the shot-noise limit is beaten when $|\alpha|^2 \gg \sinh^2(r)$. For the QFI, we obtain a bound of $$\delta_{QFI}^{MZI}(r_S) \approx \frac{1}{\psi_{0,k}\sqrt{M}} \frac{4r_b^2}{r_S L_p} \frac{c_{s0}^2}{c^2} \frac{8}{\delta_p L_p} \Delta\phi_{QFI}^\Delta, \quad (82)$$

where (as per L. Pezze et all, above)

$$\Delta\phi_{QFI}^\Delta = \frac{1}{\sqrt{|\alpha|^2 e^{2r} + \sinh^2(r)}}. \quad (83)$$

It is clear that the phase sensitivity given by equation (83) is different than that given by (76). This is because the latter corresponds to a single mode parameter estimation. However, it is possible to get access to this information only by comparing with an external reference phase. This can be done by performing instead a dual parameter estimation (see M. G. A. Paris, International Journal of Quantum Information 07, 125 (2009)) and considering on the Fisher information metric only the sector corresponding to the phase difference, which then leads to the phase sensitivity given by equation (83). For further details, we refer the reader to M. Jarzyna and R. Demkowicz-Dobrzański, Phys. Rev. A 85, 011801 (2012). This sensitivity beats the shot-noise limit when $r \gg 1$ and achieves Heisenberg scaling when $|\alpha|^2 \sim \sinh^2(r)$. Additionally, the QFI can be saturated by considering a parity measurement instead (B. T. Gard, C. You, D. K. Mishra, R. Singh, H. Lee, T. R. Corbitt, and J. P. Dowling, EPJ Quantum Technology 4, 4 (2017)) or by performing a bayesian protocol (L. Pezze and A. Smerzi, Phys. Rev. Lett. 100, 073601 (2008)).

An additional enhancement exclusive to the BEC setup can be made by implementing a pumped-up SU(1, 1) scheme with a pump that transfers excitations on the atom-field from the bulk to the phonons. With the implementation of tritter gates and parametric amplifiers, it is possible to increase the sensitivity by a factor of $2|\csc(2\theta)|\sqrt{N_{ph}/N_{at}}$ where $\theta$ is a mixing angle, $N_{ph}$ is the total number of phonons and $N_{at}$ is the number of atoms. However, care must be taken upon the choice of mixing parameters since a large transfer of atom excitations pumped into the phonon state may destroy the condensate.

A. Comparison with the Optimal Bound Given by the QFI

It is not possible to use the exact same parameters to compare the sensitivities achieved with phonon number difference and with parity/QFI since each reach their minimum with different values of the squeezing parameter. For the $\hat{J}_z$ measurement, a value of $|\alpha|=10^3$ (corresponding to a number of Rubidium atoms of $10^9$) fixes the optimal sensitivity with a squeezing parameter of $r=3.77$. Using equation (80) we obtain a relative error of $\delta_{exp}^{MZI}(r_s)=4.92\times 10^{-8}$ for a single-shot and $\delta_{exp}^{MZI}(r_s)=2.14\times 10^{-11}$ after one year of integration time. For the parity measurement/QFI the relative error reads $\delta_{QFI}^{MZI}(r_s)=3.43\times 10^{-8}$ after a single shot-measurement, further leading to $\delta_{QFI}^{MZI}(r_s)=1.49\times 10^{-11}$ after a year of integration, with a squeezing parameter of $r=5.29$. The additional correction assuming a pumped-up SU(1,1) setup was chosen with a mixing angle of $\theta \sim 0.1$, which pumps the number of phonons up to 1% the number of atoms.

B. Comparison with Previous Schemes

One of the main advantage of our proposal is its dimensions. At the scale of micrometres, its portability exceeds that of current atom interferometry setups by at least two orders of magnitude.

While its sensitivity appears be below than those reported by the other proposals, it is also important to note that the time scale at which the experiment can be realised is shorter than their integration time, since the reported running time of our proposal corresponds to a single run. We can calculate the integration time $T_{ini}=M\times 6$ s in order to reach the other setups' sensitivities, obtaining $T_{ini}\approx 1.96$ hours to reach the precision of the atom interferometers and $T_{ini}\approx 3.22$ hours to reach the precision of a previous on-chip BEC. As an additional note, another promising setup of length $10^{-5}$ m that relies on optomechanics was recently proposed. Although its relative error is yet to be experimentally confirmed, it is reported to be $10^{-13}$ in a cycle time of $10^{-3}$ s. However, our proposal is a purely static BEC, which further simplifies its experimental implementation.

Section VIII. Conclusions and Discussion

We have discussed above how to employ the phonon field in an effectively 1-dimensional BEC as a quantum probe of the gravitational field of the Earth. We compared it to the light field in a 1-dimensional optical cavity used for the same purpose. The external field can be easily tuned by finding the point at which the BEC bulk keeps its position.

Each single mode of the quantum fields can be seen as a spatially extended clock. We found that the BEC clock and the optical cavity clock can measure time with a relative precision of up to $10^{-16}$ and $10^{-7}$ for a single measurement, respectively. However, to achieve these levels of sensitivity, the duration of a single measurement on the BEC clock must be 6 s, the maximal lifetime of the phonons in the BEC, while a single measurement on the light field in the cavity only needs to take 70 ns, the life-time of the photon state in the cavity. In particular, the maximal time resolution of a light cavity clock is $10^{-16}$ s while it is about $10^{-6}$ s for the BEC clock. The reason for this is the much higher frequency of the light field modes in comparison to the phonon field modes. We assumed optical frequencies for the light cavity. Therefore, it is a proper lower bound for realistic detector systems. We also discussed the estimation of red shift and the Schwarzschild radius using two independent time measurements at different radial distances from the surface of the Earth. For an integration time of one year, we found a relative error bound of $10^{-6}$ and $10^{-4}$ for the light cavity clock and the BEC clock respectively.

We introduced a novel idea of how to measure the proper acceleration or the Schwarzschild radius of the Earth with two differently oriented BECs/cavities on the length scale of 200 μm. The basis of the measurement is the difference of the fundamental frequency of phonon modes in differently oriented BECs (or photon modes in differently oriented cavities) due to the deformation of the length of the trapping potential of the BEC (or the length of the cavity). There are three separate effects that play a role. The first is the fundamental difference between the proper length of a rigid rod and the radar length, which defines the fundamental frequency in a curved spacetime. This effect is completely given by the finite extension of the clocks we consider. The second effect is the deformation of the material which holds the cavity and the material that holds the devices that generate the external potential which holds the BEC, respectively. Finally, the third and dominant effect is a possible deformation of the BEC cloud due to a mismatch on gravitational parameters. We assumed the material to be a rod of mass density $\rho_{rod}$ and Young's module E, and we assumed the whole device to be supported from below. We found that the effect of the deformation of matter is much larger than the effect of the deformation of spacetime for any realistic situation.

The measurement for the estimation of the gravitational acceleration or the Schwarzschild radius can be done by two independent time measurements on the two clocks and subsequent comparison of the results or by a measurement on the combined system of the two differently oriented clocks in a Mach-Zehnder interferometer-like scheme. The relative error bound for the estimation of the Schwarzschild radius on the length scale of 200 μm turned out to be, respectively, $10^{-5}$ and $10^{-16}$ for the light cavity in the optical regime and for the BEC if the rod which keeps the length of the BEC/cavity fixed is made from aluminium. Finally, for the MZI setup we get bounds of $10^{-11}$ both for the $\hat{J}_z$ measurement and for the QFI/parity measurement with the additional improvement of pumped-up setups.

Detailed Discussion: Gradiometer

The collective oscillations of the atoms in BECs can also/alternatively be used to estimate a field gradient causing perturbations in a BEC, for example a gravity gradient. In principle, this can enable the measurement of a gravity gradient due to a mass. Below we demonstrate our method by considering spherical masses ranging from the size of the earth to small spheres with masses down to hundreds of milligrams. It will be appreciated that the method can be adapted for use with other masses of different sizes and shapes. It is notable however that the measurement scheme functions on the length scale of a BEC, which is of the order of micrometres.

The principle of gradiometry is based on the fact that an external force adds a quadratic term to the trap potential which changes the frequencies of the collective oscillations of the BEC. Consider a spherically symmetric trapping potential given by $V_{trap}=m\omega_0^2(x^2+y^2+z^2)/2$, where $\omega_0$ is the trapping frequency and m is the mass of the atoms in the BEC. In the case of the gravitational field of a massive sphere, the quadratic term in the potential is proportional to the gravity gradient. The BEC 38 is therefore spherically symmetric, and possesses a radius $\mathcal{R}_0$.

If this setup is placed in a gravitational field represented by a Newtonian potential $\phi$, the total potential is given by $V=V_{trap}+m\Phi$. The gravitational field of a spherically symmetrical, homogeneous mass distribution can be written as $\Phi=-MG/R$ where M is the total mass, G is Newton's gravitational constant and R is the radial distance from the centre of the mass distribution. Assuming that the centre of the mass distribution is located along the z-axis at a distance R from the centre of the trap potential, the gravitational field can be written as $$\Phi = -MG\left(\frac{z}{R^2} - \frac{\rho^2 - 2z^2}{2R^3}\right)$$

up to second order in the spatial distances, where $\rho^2=x^2+y^2$. Therefore, the total potential seen by the BEC can be written as $$V = \frac{m(\omega_\perp^2 \rho^2 + \omega_z^2(z-z_g)^2)}{2} + C,$$

where $\omega_\perp=(\omega_0^2+MG/R^3)^{1/2}$, $\omega_z=(\omega_0^2+2 MG/R^3)^{1/2}$, $z_g=MG/R^2\omega_z^2$ and $$C = -m\left(\frac{MG}{R^2}\right)^2 / 2\omega_z^2.$$

The linear part of the Newtonian potential leads to a shift of the equilibrium position of the BEC.

By defining $z'=z-z_g$ and by neglecting the constant term C (or cancelling it by an additional global contribution to the time evolution of phonon modes), a new potential is obtained:

$$V = \frac{m}{2}(\omega_\perp^2 \rho^2 + \omega_z^2 z'^2). \tag{1}$$

It can be seen that the trap frequencies depend on the gravity gradient $\epsilon_{grad}:=2 MG/R^3$, which forms the basis of its measurement.

In an axially symmetric potential such as Eq. 1, the BEC's stationary density can be approximated as $n=\mu(1-(\rho^2+\lambda^2 z'^2)/\mathcal{R}^2)/U_0$, where $\lambda=\omega_z/\omega_\perp$ encodes the shape of the BEC (in our case $\lambda<1$ which corresponds to a prolate shape), $\mathcal{R}$ is the radius of the BEC, $U_0=4\pi\hbar^2 a_{scatt}/m$, $a_{scatt}$ is the scattering length and $\mu$ is the chemical potential. The radius of the BEC can be given in terms of the chemical potential as $\mathcal{R}^2=2\mu/m\omega_\perp^2$ and the total number of atoms can be derived from the density as $N_a=8\pi\mathcal{R}^3 \mu/15U_0\lambda$. This leads to an expression for the radius of the BEC as $\mathcal{R}=(150U_0\lambda/4\pi m N_a\omega_\perp^2)^{1/5}$.

The above approximation is called the Thomas-Fermi approximation and it describes the density profiles in experimental situations quite accurately if $N_a a_{scatt}/\bar{a}_{HO}>>1$, where $N_a$ is the number of atoms in the BEC, $\bar{a}_{HO}=(\hbar/m\bar{\omega})^{1/2}$ and $\bar{\omega}=(\omega_\perp^2 \omega_z)^{1/3}$. The parabolic density profile and the spheroidal shape of the BEC give rise to a specific set of modes of density perturbations the density perturbations have the spatial dependence on $\delta n \propto r^l Y_{lm}(\theta,\phi)$ in spherical coordinates $r=\sqrt{\rho^2+z^2}, \theta=\arccos(z/r)$ and $\phi=\arctan(y/x)$, where $Y_{lm}(\theta,\phi)$ is the spherical harmonic function with angular momentum l and the z-component of the angular momentum vector $m=\pm l$ or $m=\pm(l-1)$. These two types of modes are denoted as $\delta n_{l,l}$ and $\delta n_{l,l-1}$. The corresponding angular frequencies are given as $\omega_{l,l}^2 = l\omega_\perp^2$ and $\omega_{l,l-1}^2 = (l-1)\omega_\perp^2 + \omega_z^2$, respectively. The gravity gradient is expected to be much smaller than that of the trap potential. Therefore, the frequencies can be approximated as $\omega_{l,l} \approx \sqrt{l}(\omega_0 + GM/2R^3\omega_0)$ and $\omega_{l,l-1} \approx \sqrt{l}(\omega_0 + (l-3)GM/2lR^3 \omega_0)$.

The modes $\delta n_{l,l}$ and $\delta n_{l,l-1}$ contain information about the gravity gradient $\epsilon_{grad} := 2\,MG/R^3$ as an external parameter. Therefore, it is possible to estimate its value from a measurement on these modes.

A lower bound for the relative error $\delta_\epsilon$ of any estimation of a given parameter E imprinted on a given mode can be obtained from the quantum Cramer-Rao bound (QCRB). The QCRB can be expressed in terms of the quantum Fisher information (QFI) $H_\epsilon$ and the number of measurements N as $\Delta_\epsilon = 1/\sqrt{NH_\epsilon}$. The corresponding relative error bound is obtained as $\delta_\epsilon = 1/|\Sigma|/\sqrt{NH_\epsilon}$. Since $MG/R^3$ is imprinted only on the frequency, we obtain the minimal relative error for the estimation of $\epsilon_{grad}$ by Gaussian error propagation from the minimal error of an estimation of a phase change $\Delta\phi = \Delta\omega t$ as $\delta_\epsilon = \delta_{\Delta\phi}/|d \ln(\Delta\phi)/d \ln(\epsilon_{grad})|$, where $\Delta\omega = \sqrt{l}\epsilon_{grad}/4\omega_0$ for the mode $\delta n_{l,l-1}$. Therefore, we find that $\delta_\epsilon = \delta_{\Delta\phi}$. If the initial state of the mode under consideration is assumed to be a Gaussian state and if only a one single mode is being measured, the optimal precision for the measurement of a phase change is reached for a squeezed vacuum state and the corresponding QFI becomes $H_{\Delta\phi} = 8n(n+1)$, where $n = \sinh^2 r$ is the number of squeezed phonons, where r is the squeezing parameter. Then:

$$\delta_{\epsilon_{grad}} = \frac{2\omega_0^2}{\alpha(l)\epsilon_{grad}} \frac{1}{\sqrt{l}\omega_0 t \sqrt{2Nn(n+1)}}.\quad (2)$$

where $\alpha(l) = 1$ for the modes $\delta n_{l,l}$ and $\alpha(l) = |(l-3)/l|$ for the modes $\delta n_{l,l-1}$.

We now evaluate the relative error bound in Eq. (2) for two specific situations; the gravitational field of the earth and the gravitational field of a sphere of tungsten or gold. Lets assume that the trapping frequency is $\omega_0 = 2\pi \times 0.2$ Hz. For a rubidium-87 BEC of $10^6$ atoms this would lead to a radius of 120 μm and a central density of $n(0) \sim 10^{11}$ cm$^{-3}$, which is fully in the currently experimentally accessible regime. This would lead to a radius of 380 μm and a central density of $n(0) \sim 10^{12}$ cm$^{-3}$. The small density of the BEC is an advantage as it leads to a long half life time of the BEC density. It can be was shown that the density depends on time as $$\frac{d\rho(t)}{dt} = -D\rho(t)^3,$$

where D is the decay constant. Therefore, after solving the differential equation, we find a quadratic dependence of the density half life time on the inverse density, i.e. $t_{hl} = 3/2D\rho^2$. Previous experiments with rubidium atoms found the decay constant to be $D = 1.8 \times 10^{-29}$ cm$^6$ s$^{-1}$. For a density of the order of $10^{12}$ cm$^{-3}$, this leads to a theoretical half life time of the order of the order of $10^5$ s. Therefore, it can safely assumed that the BEC density can be kept constant for a duration of each experiment of the order of 100 s. Then, the second limiting time scale that one has to consider is the coherence time of the phonons. For BECs of temperatures T below or of the order of the chemical potential divided by the Boltzmann constant $k_B$, the damping rate is given by $\gamma \sim \sqrt{l}\omega_0(k_B T/\mu)^{3/2}(n(0)a_{scatt}^3)^{1/2}$. Assuming l=3 and a temperature of the BEC of 0.5 nK, which can be achieved in experiments, the inverse damping rates are of the order of $10^2$ s and $10^3$ s for $10^6$ and $10^8$ rubidium atoms, respectively. From the inverse damping rate, one can calculate the coherence time of a squeezed phonon state. For the above parameters, the coherence times are calculated to be between $10^2$ m and $10^3$ m seconds. Therefore, it is justified to assume a duration of 100 s for each experiment.

For the number of independent consecutive measurements, a value of $10^4$ is assumed which corresponds to a total measurement time of about one and a half weeks. The number of squeezed phonons in the cases of $10^6$ and $10^8$ atoms, respectively, is set to $n=10^3$ and $n=10^4$ (which corresponds to a squeezing parameter of r~4 and r~5, respectively). The mode number l=3 is used. For the case of the gravitational field of the earth and R of the same order as the radius of the earth, it is found that $\omega_0^2/\epsilon_{grad}$ is of the order of $10^6$. This leads to a relative error bound of the order of $10^{-2}$ and $10^{-3}$ for $10^6$ and $10^8$ atoms, respectively. Hence in principle, it is possible to measure the gravitational gradient due to the gravitational field of the earth on the length scale of a BEC using the phonons in the condensate.

A 100 mg gold or tungsten sphere has a radius of the order of 1 mm, and one can assume a distance between the centre of the BEC and the centre of the sphere of the same order. With $\omega_0 = 2\pi \times 0.2$ Hz, it is found that $\omega_0^2/\epsilon_{grad}$ is again of the order $10^6$ and a relative error bound of the order of $10^{-2}$ and $10^{-3}$ for $10^6$ and $10^8$ atoms, respectively, by using the same system parameters as above. The reason for this scaling is that by considering R to be always of the same order as the radius of the sphere independently of its mass, the expression $$\frac{2MG}{R^3} \sim 2\rho G$$

is obtained, where ρ is the mass density of the sphere.

Therefore, the absolute sensitivity of the scheme is given as $\epsilon_{grad}\,10^{-2} \sim 10^{-7}$ s$^{-2}$ and $\epsilon_{grad}\,10^{-3} \sim 10^{-8}$ s$^{-2}$ for $10^6$ and $10^8$ atoms in the BEC, respectively. On the length scale of 100 μm, such small gradients correspond to gravitational field differences of $10^{-9}$ Gal ($10^{-12}$ g) and $10^{-10}$ Gal ($10^{-13}$ g), respectively. $10^4$ repetitions of the experiments are considered. Therefore, the single shot sensitivity would be comparable to a differential force sensitivity of the order of $10^{-7}$ Gal ($10^{-10}$ g) and $10^{-8}$ ($10^{-11}$ g), respectively, which is one order of magnitude better than what is achieved by state of the art atom interferometry.

To measure the gravity gradient induced by even smaller masses, the trapping frequency would have to be increased to decrease the radius of the BEC. This would lead to a decrease of the sensitivity. For example, a gold or tungsten sphere with a mass of the order of 100 μg has a radius of the order of 100 μm. To get a BEC with a radius of the order of 10 μm with $10^5$ rubidium-87 atoms, we have to use a trapping frequency $\omega_0 = 2\pi \times 20$ Hz. The corresponding central density is of the order of $10^{-13}$ cm, which still allows for experimental times of 100 s in principle. Using the same parameters for the phonon state as above, we obtain a relative error bound of the order of $10^{-1}$ and $10^2$ for $10^6$ and $10^8$ atoms, respectively and an absolute error bound of 10.8 gal ($10^{-11}$ g) for $10^6$ atoms and $10^{-9}$ gal ($10^{-12}$ g) for $10^8$ atoms with $10^4$ repetitions.

To have a chance to reach the relative error bound given in Eq. (2), there has to be a phase reference to compare the phase change of the probe state with. In particular, the frequency of the reference has to be exactly $\sqrt{l}\omega_0$. One possibility to avoid this would be to use two modes of perturbations of the BEC density and compare them with each other such as in a Mach-Zehnder interferometer (MZI) scheme. By comparing two modes with the same angular momentum l but different quantum number m, the difference of the two frequencies can be approximated as:

$$\Delta\omega_l = \omega_{l,l} - \omega_{l,l-1} \approx \frac{3\epsilon_{grad}}{2\sqrt{l}\,\omega_0}. \quad (3)$$

The frequency difference would lead to an accumulated phase difference between the modes $\Delta\varphi_l=\Delta\omega_l t$. Note that the frequency difference (Eq. 3) decreases with increasing angular momentum l. This is in contrast to the change of frequency of each single mode due to the gravitational field considered above. This would enable multi-mode operations that can be used for the implementation of MZI schemes. In metrology with optical modes, there are two distinct classes of schemes of Mach-Zehnder interferometry commonly used; SU(2) and SU(1,1). SU(2) schemes only consider passive optical elements and the SU(1,1) schemes contain active optical elements. In all schemes the optimal QFI depends on the total number of particles in the two arms of the interferometer which we denote as n in the following. It can be shown that the optimal QFI for a phase measurement for the SU(2) scheme is reached for two identically squeezed and coherently displaced states at the two input ports of the first beam splitter of the MZI. The total number of squeezed particles has to be ⅔ of the total number particles $\bar{n}$. For the case of $\bar{n}\gg 1$, the optimum $H_{\delta\varphi}^{SU(2)}\approx 8\bar{n}(\bar{n}+2)/3$. In contrast to the SU(2) scheme, the SU(1,1) scheme uses optical parametric amplifiers (OPA) instead of passive beam splitters. At the OPA the light fields interact non-linearly and they are additionally squeezed. It can also be shown that the optimal QFI for the SU(1,1) scheme is given as $H_{\delta\varphi}^{SU(1,1)}\approx 4\bar{n}(\bar{n}+2)/3$ for $\bar{n}\gg 1$. To reach this QFI, two coherent states with the same number of particles have to injected into the two ports of the MZI and the number of squeezed particles that are created at the OPA should be ⅔ of the number total number of particles in the arms of the interferometer. If the number of squeezed particles is fixed, $H_{\delta\varphi}^{SU(2)}$ and $H_{\delta\varphi}^{SU(1,1)}$ differ from the optimal single mode QFI that we discussed above approximately by a factor ¾ and ⅜, respectively.

However, it is in general more easy to create highly excited coherent states than large squeezing. A particular adaptation of the SU(1,1) scheme is also beneficial when the number of squeezed particles is much smaller than the total number of particles. It is called "pumped-up" SU(1,1) interferometry because the active optical elements are additionally pumped by a strong coherent light field. It is shown that the optimal QFI for the pumped up SU(1, 1) scheme becomes $H_{\delta\varphi}^{pu}=\bar{n}e^{2r}/4$. For $\bar{n}=\sinh^2 r$ and $\bar{n}\gg 1$, and it is found that $H_{\delta\varphi}^{pu}$ differs from the one mode QFI by a factor 1/16. However, in situations where the number of coherent particles is much larger than the number of squeezed particles, the application of the pumped up SU(1,1) interferometry can be truly beneficial.

SUMMARY

The above work shows that the density of a trapped BEC is modified by gravity and that this affects the evolution of collective BEC modes. In the case of trapping potentials that produce a constant and uniform density in the absence of gravity (e.g. box potentials), one can find modes that acquire different phase changes in the presence of gravity.

A phase acquired by a quantum state $|\varphi\rangle$ during its evolution is given by $e^{i\theta(t)}|\varphi\rangle$. In this case the phase shift $\theta(t)$ is a function of time t. In our work, the quantum state can describe one or more modes. In the discussions above we focus on the state of two modes but our scheme can be applied to more modes if required.

To measure a phase we need it to be a relative phase i.e. of the form $$|\varphi_f\rangle=|\varphi_1\rangle+e^{i\theta(t)}|\varphi_2\rangle$$

Where $|\varphi_1\rangle$ and $|\varphi_2\rangle$ are two different states of the system.

As explained above, the phase shift $\theta(t)$ depends on the gravitational parameters and that is why we can then us it to measure gravity and its gradient.

It will be appreciated that the case described above is a special one. As well as affecting the phase difference between two modes of a system, an external field applied to a closed system might cause excitations to transfer between two modes of the system, or new excitations to be created within one or more of the modes.

A more general evolution of a quantum system can be modelled using a unitary transformation. A unitary is given by $e^{i\hat{\Theta}(t)}$ where now $\hat{\Theta}(t)$ is not only a function of t but a matrix. This is the most general evolution a quantum system undergoes when the system is closed (when it does not interact with the environment). It acts on the state of the system as $e^{i\hat{\Theta}(t)}|\varphi\rangle$ where the quantum state $|\varphi\rangle$ can describe one or more modes.

$$|\varphi_f\rangle=e^{i\hat{\Theta}(t)}|\varphi\rangle=\Sigma C(t)_{ij}|\varphi_i\rangle|\varphi_j\rangle$$

Here $C(t)_{ij}$ are functions of t. A phase is then a special case where $C(t)_{ij}=0$ if $i\neq j$ and $C(t)_{ij}=\theta_i(t)$ if $i=j$. Here $\theta_i(t)$ is again a function of t. If the modes are phonon modes trapped in a potential in the presence of gravity, the numbers $C(t)_{ij}$ will depend on the gravitational parameters and can be used to measure them. In M. Ahmadi, D. E. Bruschi, C. Sabín, G. Adesso and I. Fuentes, Sci. Rep. 4, 4996 (2014) (noted in the background section above) we analyse the case of an oscillating cavity in flat spacetime with acceleration a.

If the unitary transformation acts on a m number of modes but we measure only n (with n<m) or if the system undergoes losses due to the interaction with the environment, then the modes of interest n evolve under a Complete Positive map which is the transformation we obtain after tracing out the degrees of freedom which we do not measure.

In both cases, the evolution of the modes is no longer pure (pure means it can be represented by a vector $|\varphi\rangle$ in the Hilbert space). Instead the states are mixed, which means that the state can no longer be represented by a vector in the Hilbert space but by a matrix, called the density matrix, which is an operator acting on the Hilbert space. The schemes described herein work with both pure and mixed states.

For more general trapping potentials that produce time varying and/or non-uniform density, the mode evolution may be a complete positive map that encodes the gravitational parameters. Complete positive maps include the case where the evolution is a phase (as discussed above), but also extend to unitary transformations such as a Bogoliubov transformations and to non-unitary evolutions due to decoherence. The field parameters (including the gravitational field strength (gravimeter example above) and its gradient (gradiometer example above)) can be estimated in the Newtonian or General relativistic regimes by measuring the system (for example the phase difference between the modes) using absorption imaging, interaction with a cavity mode, interaction with a laser, interaction with impurities among other methods.

The scheme therefore considers two or more frequency modes (including zero momentum and sharp momentum modes, also superpositions of sharp momentum modes) of a single or multiple trapped BECs (trapping potentials can give rise to uniform, non-uniform, constant and varying density). The modes can be prepared in a suitable quantum state (which can be separate or entangled states and can include coherent, squeezed, or any other pure or mixed state) such that the mode evolution encodes the field (e.g. gravitational) parameter to be estimated.

We thus disclose a method of measuring the gravitational field using one or more trapped BECs and at least two atomic field modes within those BECs, wherein the gravitational field leads to a change of the field modes' time evolution amounting to a gravitational-dependent phase or/and a number of excitations being exchanged between the modes (the number of excitations exchanged by the modes depending on the gravitational field) or/and a number of new excitations being created in the modes (the number of created excitations depending on the gravitational field). The method comprises:

selecting at least two modes whose initial states have changed due to the gravitational field;

measuring the phase difference, or counting the number of excitations exchanged by the modes or counting the number of excitations created within the modes; and using either the measured phase difference, the number of excitations exchanged, the number of excitations created, or a combination of any of these to infer the acceleration.

Number of excitations may be counted using standard methods including absorption imaging, homodyne or heterodyne detection, through interactions with a laser field or cavity field.

The above work differs from atom interferometry in that we consider the atoms to be trapped, and we include interactions between those trapped atoms so that the modes we consider are collective modes. Our modes are sharp in frequency and delocalised in the extent of the system. Instead atom interferometry considers free falling spatially separated single particle states.

The above work is distinguished from double-well systems in that such schemes consider only right atoms vs left atoms rather than phononic modes, and do not consider how gravity affects the density.

The invention claimed is:

1. A method of measuring an acceleration due to a gravitational field using one or more Bose-Einstein condensates (BECs),
wherein the one or more BECs, include:
a first atomic field mode comprising collective oscillations within the one or more BECs propagating in a first direction, wherein the first atomic field mode is a phonon mode; and
a second atomic field mode comprising collective oscillations within the one or more BECs propagating in a second direction different to the first direction, wherein the second atomic field mode is a phonon mode;
wherein the first atomic field mode and the second atomic field mode are linearly independent modes, such that the acceleration causes the first atomic field mode and the second atomic field mode to have a different effective length;
wherein the method comprises:
measuring a phase difference between the first atomic field mode and the second atomic field mode within the one or more BECs, the phase difference resulting from an effect of the acceleration on the linearly independent modes of the first and second atomic field modes; and
using the measured phase difference to measure the acceleration due to the gravitational field.

2. The method of claim 1, wherein the first direction is parallel to a direction of the acceleration due to the gravitational field and the second direction is perpendicular to the direction of the acceleration due to the gravitational field.

3. The method of claim 1, further comprising the steps of:
condensing a first BEC in a first atom trap having a first length $L_p$ between first and second locations (which may be boundaries) $\bar{r}_b$ and $\bar{r}_t$,
condensing a second BEC in a second atom trap having a second length $L_p$ between third and fourth locations (which may be boundaries) $z_l$ and $z_r$, the second length being equal to the first length,
wherein the first atomic field mode is measured in the first BEC and the second atomic field mode is measured in the second BEC.

4. The method of claim 3, wherein the first BEC is confined in a box potential and wherein the second BEC is confined in a box potential.

5. The method of claim 3, wherein the first length $L_p$ of the first BEC and the second length $L_p$ of the second BEC are held constant by a respective rigid rod, and wherein deformation of the rigid rod due to gravity is taken into account for the first BEC but neglected for the second BEC.

6. A method of measuring an acceleration using one or more trapped Bose-Einstein condensates, (BECs), and at least two atomic field modes, each atomic field mode comprising collective oscillations within said one or more trapped BECs, wherein a density distribution of at least one of the one or more trapped BECs is modified by the acceleration, which leads to a change of a time evolution of the at least two atomic field modes'; wherein the method comprises:
selecting two atomic field modes that are differently affected by the acceleration, the two atomic field modes each being a phonon mode and wherein the two atomic field modes are linearly independent modes, such that the acceleration causes the two atomic field modes to have a different effective length; and
measuring an acceleration-induced difference; and
using the measured acceleration-induced difference to infer the acceleration.

7. The method of claim 6, wherein the acceleration is an acceleration due to gravity, and wherein the acceleration-induced difference between the two atomic field modes comprises one or more of:
(i) an acceleration-dependent phase difference,
(ii) a number of excitations exchanged between the two atomic field modes, and
(iii) a number of new excitations created within one or both of the two atomic field modes.

8. The method of claim 7, wherein the phase difference between a first atomic field mode and a second atomic field mode is used to estimate the local Schwarzschild radius $r_s$.

9. The method of claim 8, wherein the local gravitational field g is estimated from the local Schwarzschild radius $r_s$ using $$g = \frac{r_s c^2}{2\bar{r}_b^2}$$

where $\bar{r}_b$ is the radial height coordinate within the gravitational field and c is the speed of light.

10. The method of claim 6, further comprising condensing the one or more trapped BECs in a trapping potential which is tuned to partially cancel the acceleration caused by a gravitational field, such that a density perturbation $\delta_\rho$ is created in the BEC.

11. The method of claim 6, further comprising the steps of:

condensing a first BEC in a first atom trap having a first length $L_p$ between first and second locations (which may be boundaries) $\bar{r}_l$ and $\bar{r}_r$, condensing a second BEC in a second atom trap having a second length $L_p$ between third and fourth locations (which may be boundaries) $z_l$ and $z_r$, the second length being equal to the first length, wherein a first atomic field mode is measured in the first BEC and a second atomic field mode is measured in the second BEC.

12. The method of claim 11, wherein the first BEC is confined in a box potential and wherein the second BEC is confined in a box potential.

13. The method of claim 11, wherein the first length $L_p$ of the first BEC and the second length $L_p$ of the second BEC are held constant by a respective rigid rod, and wherein deformation of the rigid rod due to gravity is taken into account for the first BEC but neglected for the second BEC.

14. The method of claim 11, further comprising creating a squeezed state for a mode k of the first BEC.

15. The method of claim 14, further comprising preparing a coherent state or a squeezed state for a mode of the second BEC having the same mode number k as the squeezed state of the first BEC.

16. The method of claim 14, further comprising entangling the first and second atomic field modes.

17. The method of claim 16, wherein a phase shift is introduced between the first and second atomic field modes, wherein the phase shift is $\pi/2$.

18. The method of claim 6, wherein a spacetime geometry of the one or more trapped BECs is described using Schwarzschild geometry in order to calculate the acceleration due to gravity.

19. A quantum accelerometer operable to perform the method of claim 6.

* * * * *